(12) United States Patent
Masuda et al.

(10) Patent No.: US 12,030,041 B2
(45) Date of Patent: Jul. 9, 2024

(54) STRUCTURED CATALYST FOR STEAM REFORMING, REFORMING APPARATUS PROVIDED WITH STRUCTURED CATALYST FOR STEAM REFORMING, AND METHOD FOR MANUFACTURING STRUCTURED CATALYST FOR STEAM REFORMING

(71) Applicant: FURUKAWA ELECTRIC CO., LTD., Tokyo (JP)

(72) Inventors: Takao Masuda, Sapporo (JP); Yuta Nakasaka, Sapporo (JP); Takuya Yoshikawa, Sapporo (JP); Sadahiro Kato, Tokyo (JP); Masayuki Fukushima, Tokyo (JP); Hiroko Takahashi, Tokyo (JP); Yuichiro Banba, Tokyo (JP); Kaori Sekine, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/698,496

(22) Filed: Nov. 27, 2019

(65) Prior Publication Data
US 2020/0094232 A1    Mar. 26, 2020

Related U.S. Application Data

(63) Continuation of application No. PCT/JP2018/021095, filed on May 31, 2018.

(30) Foreign Application Priority Data

May 31, 2017    (JP) ................................ 2017-108640

(51) Int. Cl.
*B01J 29/76*    (2006.01)
*B01J 29/12*    (2006.01)
(Continued)

(52) U.S. Cl.
CPC .......... *B01J 29/7669* (2013.01); *B01J 29/12* (2013.01); *B01J 29/14* (2013.01); *B01J 29/44* (2013.01);
(Continued)

(58) Field of Classification Search
CPC   B01J 29/0316; B01J 29/0333; B01J 29/0354; B01J 29/0356; B01J 29/12;
(Continued)

(56) References Cited

U.S. PATENT DOCUMENTS 3,898,180 A    8/1975   Crooks et al.
4,552,855 A    11/1985  Ozin et al.
(Continued)

FOREIGN PATENT DOCUMENTS

CA    2256515 A1    12/1997
CN    1223602 A     7/1999
(Continued)

OTHER PUBLICATIONS

English machine translation of CN 106362787 A, entitled "Preparation method for zeolite-immobilized photocatalyst" dated Feb. 1, 2017.
(Continued)

*Primary Examiner* — Brian A McCaig
(74) *Attorney, Agent, or Firm* — Dorsey & Whitney LLP

(57) ABSTRACT

A structured catalyst for steam reforming of the present disclosure is used for producing reformed gas containing hydrogen from a reforming raw material containing hydrocarbon, and includes a support having a porous structure constituted of a zeolite-type compound, and at least one catalytic substance present inside the support. The support includes channels connecting with each other, and the catalytic substance is metal nanoparticles and present at least in the channels of the support.

19 Claims, 4 Drawing Sheets

(51) Int. Cl.
*B01J 29/14* (2006.01)
*B01J 29/44* (2006.01)
*B01J 29/46* (2006.01)
*B01J 29/67* (2006.01)
*B01J 29/68* (2006.01)
*B01J 29/74* (2006.01)
*B01J 35/00* (2006.01)
*B01J 37/02* (2006.01)
*B01J 37/10* (2006.01)
*B01J 37/18* (2006.01)
*C01B 3/40* (2006.01)

(52) U.S. Cl.
CPC ............... *B01J 29/46* (2013.01); *B01J 29/67* (2013.01); *B01J 29/68* (2013.01); *B01J 29/7469* (2013.01); *B01J 35/0013* (2013.01); *B01J 35/006* (2013.01); *B01J 35/0066* (2013.01); *B01J 37/0211* (2013.01); *B01J 37/105* (2013.01); *B01J 37/18* (2013.01); *C01B 3/40* (2013.01); *C01B 2203/0233* (2013.01); *C01B 2203/1011* (2013.01); *C01B 2203/1058* (2013.01); *C01B 2203/1064* (2013.01); *C01B 2203/1235* (2013.01)

(58) Field of Classification Search
CPC ........ B01J 29/126; B01J 29/14; B01J 29/146; B01J 29/44; B01J 29/46; B01J 29/67; B01J 29/68; B01J 29/7469; B01J 29/7669; B01J 35/0013; B01J 35/002; B01J 35/006; B01J 35/0066; B01J 37/0211; B01J 37/105; B01J 37/18; C10B 3/40; C10B 37/02; C10B 2203/0233; C10B 2203/1011; C10B 2203/1058; C10B 2203/1064; C10B 2203/1235
See application file for complete search history.

(56) References Cited

U.S. PATENT DOCUMENTS

| | | |
|---|---|---|
| 5,026,673 A | 6/1991 | Gates et al. |
| 5,236,575 A | 8/1993 | Bennett et al. |
| 5,275,720 A | 1/1994 | Ward |
| 5,849,652 A | 12/1998 | Davies et al. |
| 5,994,603 A | 11/1999 | Mohr et al. |
| 6,040,259 A | 3/2000 | Mohr et al. |
| 6,831,203 B1 | 12/2004 | Mohr et al. |
| 6,881,703 B2 | 4/2005 | Cutter et al. |
| 7,074,373 B1 | 7/2006 | Warren et al. |
| 7,592,291 B2 | 9/2009 | Rollins et al. |
| 7,893,311 B2 | 2/2011 | Takamatsu et al. |
| 2003/0109383 A1 | 6/2003 | Koike et al. |
| 2003/0188991 A1 | 10/2003 | Shan et al. |
| 2004/0176245 A1 | 9/2004 | Hagemeyer et al. |
| 2004/0192947 A1 | 9/2004 | Chane-ching et al. |
| 2005/0201920 A1 | 9/2005 | Shan et al. |
| 2006/0211777 A1 | 9/2006 | Severinsky |
| 2006/0216227 A1 | 9/2006 | Idem et al. |
| 2007/0004593 A1 | 1/2007 | Ohno et al. |
| 2007/0167551 A1 | 7/2007 | Goodwin et al. |
| 2008/0045400 A1 | 2/2008 | Rollins et al. |
| 2008/0045403 A1 | 2/2008 | Rollins et al. |
| 2008/0051280 A1 | 2/2008 | Hagemeyer et al. |
| 2008/0072705 A1 | 3/2008 | Chaumonnot et al. |
| 2008/0280754 A1 | 11/2008 | Toledo et al. |
| 2008/0293990 A1 | 11/2008 | Stevenson et al. |
| 2009/0286677 A1 | 11/2009 | Takeshima et al. |
| 2009/0325790 A1 | 12/2009 | Haller et al. |
| 2010/0004118 A1 | 1/2010 | Liu et al. |
| 2011/0085944 A1 | 4/2011 | Rollins et al. |
| 2011/0092356 A1 | 4/2011 | Rollins et al. |
| 2011/0092745 A1 | 4/2011 | Senoo et al. |
| 2011/0121238 A1 | 5/2011 | Wakatsuki |
| 2011/0293941 A1 | 12/2011 | Chaumonnot et al. |
| 2012/0042631 A1 | 2/2012 | Schmieg et al. |
| 2012/0060472 A1 | 3/2012 | Li et al. |
| 2012/0130138 A1 | 5/2012 | Yamaguchi et al. |
| 2012/0142238 A1 | 6/2012 | Saitou et al. |
| 2012/0231948 A1 | 9/2012 | Saito |
| 2013/0041174 A1 | 2/2013 | Yamamoto et al. |
| 2013/0090445 A1 | 4/2013 | Hattori et al. |
| 2014/0021096 A1 | 1/2014 | Chaumonnot et al. |
| 2014/0128246 A1 | 5/2014 | Garcia-martinez |
| 2014/0147362 A1 | 5/2014 | Sasaki et al. |
| 2014/0284524 A1* | 9/2014 | Lee ............................ C01B 3/40 252/373 |
| 2014/0303266 A1 | 10/2014 | Hyman |
| 2015/0018590 A1 | 1/2015 | Stevenson et al. |
| 2015/0290635 A1 | 10/2015 | Inokawa et al. |
| 2015/0367332 A1* | 12/2015 | Kuvettu ................... B01J 21/16 502/66 |
| 2016/0017238 A1 | 1/2016 | Stamires et al. |
| 2016/0023913 A1 | 1/2016 | Goel et al. |
| 2016/0024400 A1 | 1/2016 | Iwasa et al. |
| 2016/0030934 A1 | 2/2016 | Zhan et al. |
| 2016/0032202 A1 | 2/2016 | Yonemura et al. |
| 2016/0087285 A1 | 3/2016 | Watanabe et al. |
| 2016/0114314 A1 | 4/2016 | Ali et al. |
| 2016/0129429 A1 | 5/2016 | Kegnæs et al. |
| 2016/0137516 A1* | 5/2016 | Kegnaes ............... B01J 37/0018 585/467 |
| 2016/0369174 A1 | 12/2016 | Kool et al. |
| 2017/0036197 A1 | 2/2017 | Kegnaes et al. |
| 2018/0194700 A1 | 7/2018 | Pan et al. |
| 2019/0039056 A1 | 2/2019 | Kato et al. |
| 2020/0094229 A1 | 3/2020 | Masuda et al. |
| 2020/0108374 A1 | 4/2020 | Masuda et al. |
| 2020/0108378 A1 | 4/2020 | Masuda et al. |
| 2020/0114335 A1 | 4/2020 | Masuda et al. |
| 2020/0114336 A1 | 4/2020 | Masuda et al. |
| 2020/0114337 A1 | 4/2020 | Masuda et al. |
| 2020/0114338 A1 | 4/2020 | Masuda et al. |
| 2020/0114339 A1 | 4/2020 | Masuda et al. |
| 2020/0114341 A1 | 4/2020 | Masuda et al. |
| 2020/0115248 A1 | 4/2020 | Masuda et al. |
| 2020/0115640 A1 | 4/2020 | Masuda et al. |
| 2020/0254432 A1 | 8/2020 | Shirman et al. |

FOREIGN PATENT DOCUMENTS

| | | |
|---|---|---|
| CN | 1720098 A | 1/2006 |
| CN | 1729138 A | 2/2006 |
| CN | 1876766 A | 12/2006 |
| CN | 101130466 A | 2/2008 |
| CN | 101180125 A | 5/2008 |
| CN | 101362959 A | 2/2009 |
| CN | 101720252 A | 6/2010 |
| CN | 101909750 A | 12/2010 |
| CN | 102056869 A | 5/2011 |
| CN | 102099114 A | 6/2011 |
| CN | 102247887 A | 11/2011 |
| CN | 102400744 A | 4/2012 |
| CN | 102574120 A | 7/2012 |
| CN | 102844115 A | 12/2012 |
| CN | 103459012 A | 12/2013 |
| CN | 103663490 A | 3/2014 |
| CN | 104650291 A | 5/2015 |
| CN | 105008492 A | 10/2015 |
| CN | 105347359 A | 2/2016 |
| CN | 1057377424 A | 3/2016 |
| CN | 106362787 A | 2/2017 |
| EP | 0485180 A1 | 5/1992 |
| EP | 2484444 A1 | 8/2012 |
| EP | 2692439 A1 | 2/2014 |
| EP | 2992984 A1 | 3/2016 |
| ER | 1709125 A | 10/2006 |
| JP | S5746925 A | 3/1982 |
| JP | H0549943 A | 3/1993 |
| JP | H06-142456 A | 5/1994 |
| JP | H07-096195 A | 4/1995 |
| JP | H08155303 A | 6/1996 |

(56) References Cited

FOREIGN PATENT DOCUMENTS

| | | |
|---|---|---|
| JP | H1133412 A | 2/1999 |
| JP | H11151440 A | 6/1999 |
| JP | 2000197822 A | 7/2000 |
| JP | 2000511107 A | 8/2000 |
| JP | 2000323164 A | 11/2000 |
| JP | 2002255537 A | 9/2002 |
| JP | 2002336704 A | 11/2002 |
| JP | 2004528158 A | 9/2004 |
| JP | 2005170903 A | 6/2005 |
| JP | 2005189586 A | 7/2005 |
| JP | 2005270734 A | 10/2005 |
| JP | 2005314208 A | 11/2005 |
| JP | 2006021994 A | 1/2006 |
| JP | 2007130525 A | 5/2007 |
| JP | 2007519799 A | 7/2007 |
| JP | 2008012382 A | 1/2008 |
| JP | 2008542177 A | 11/2008 |
| JP | 2009505830 A | 2/2009 |
| JP | 2009255014 A | 11/2009 |
| JP | 2010501496 A | 1/2010 |
| JP | 2010099638 A | 5/2010 |
| JP | 2010527769 A | 8/2010 |
| JP | 2011517439 A | 6/2011 |
| JP | 4879574 B2 | 2/2012 |
| JP | 2012153654 A | 8/2012 |
| JP | 2012170951 A | 9/2012 |
| JP | 2012210557 A | 11/2012 |
| JP | 2013255911 A | 12/2013 |
| JP | 2014104428 A | 6/2014 |
| JP | 2014534902 A | 12/2014 |
| JP | 5700376 B2 | 4/2015 |
| JP | 2015165138 A | 9/2015 |
| JP | 2015189586 A | 11/2015 |
| JP | 2016002527 A | 1/2016 |
| JP | 2016064407 A | 4/2016 |
| JP | 2016069318 A | 5/2016 |
| JP | 2016087522 A | 5/2016 |
| JP | 2016529190 A | 9/2016 |
| JP | 2017039218 A | 2/2017 |
| JP | 2017064647 A | 4/2017 |
| JP | 2017509732 A | 4/2017 |
| JP | 2017128480 A | 7/2017 |
| WO | 9745197 A1 | 12/1997 |
| WO | 9745387 A1 | 12/1997 |
| WO | 2005083014 A1 | 9/2005 |
| WO | 2007000847 A1 | 1/2007 |
| WO | 2007023558 A1 | 3/2007 |
| WO | 2009096548 A1 | 8/2009 |
| WO | 2010097108 A1 | 9/2010 |
| WO | 2010097224 A2 | 9/2010 |
| WO | 2011065194 A1 | 6/2011 |
| WO | 2012105581 A1 | 8/2012 |
| WO | 2012170421 A1 | 12/2012 |
| WO | 2013057319 A2 | 4/2013 |
| WO | 2013115213 A1 | 8/2013 |
| WO | 2014083772 A1 | 6/2014 |
| WO | 2014132367 A1 | 9/2014 |
| WO | 2015001123 A1 | 1/2015 |
| WO | 2015155216 A1 | 10/2015 |
| WO | 2016014691 A1 | 1/2016 |
| WO | 2016181622 A1 | 11/2016 |
| WO | 2017000427 A1 | 1/2017 |
| WO | 2017072698 A1 | 5/2017 |

OTHER PUBLICATIONS

English machine translation of JP 2002255537 A entitled "Solid Acid Catalyst" dated Sep. 11, 2002.
English machine translation of JP 2005314208 A entitled "Combined Porous Body and Its Manufacturing Method and Organic Substance Converting Method Using the Same" dated Nov. 10, 2005.
English machine translation of JP 2012170951 A entitled "Photocatalyst-Adsorbent Composite Powder" dated Sep. 10, 2012.
English machine translation of JP 2015165138 A entitled "Exhaust Gas Emission Control Device" dated Sep. 17, 2015.
English machine translation of JP 2016069318 A entitled "Storing Method for Secondary Alcohol and Loaded Body" dated May 9, 2016.
English machine translation of JP 2017128480 A entitled "Zeolite Including Metal Particle" dated Jul. 27, 2017.
English machine translation of JP H0549943A entitled "Oxidizing Catalyst" dated Mar. 2, 1993.
English machine translation of JPH1133412 entitled "A Production of Metal-Supporting Catalyst" dated Feb. 9, 1999.
English machine translation of WO 2007/023558 A1 entitled "Tungsten Oxide Photocatalyst, Process for Producing the Same, and Fiber Cloth Having Deodorizing/Antifouling Function" dated Mar. 1, 2007.
English machine translation of WO 2009/096548 A1 entitled "Silver-Ktitanium Oxide)-Zeolite Adsorbent/Decomposing Material and Process for Production Thereof" dated Aug. 6, 2009.
English machine translation of WO 2012/105581 A1 entitled "Method for Producing Oxide Semiconductor Layer" dated Sep. 8, 2012.
Extended European Search Report received in EP App. No. 18809956.8 dated Jan. 11, 2021.
Dai, Chengyi et al., "Hollow Zeolite Encapsulated Ni—Pt Bimetals for Sintering and Coking Resistant Dry Reforming of Methane", Journal of Materials Chemistry A, vol. 3, No. 32, Jun. 29, 2015, pp. 16461-16468.
Liu, Xue et al., "Drying of Ni/Alumina Catalysts: Control of the Metal Distribution Using Surfacants and the Melt Infiltration Methods", Industrial & Engineering Chemistry Research, vol. 53, No. 14, Apr. 9, 2014, pp. 5792-5800.
Makshina, Ekaterina et al., "Methanol Oxidation On LaCo Mixed Oxide Supported Onto MCM-41 Molecular Sieve", Catalysis Today, vol. 131, No. 1, Nov. 2007, pp. 427-430.
Maneesha, Mishra et al., "[alpha]-Fe2O3 as a photocatalytic material: A review", Applied Catalysis A: General, Elsevier, Amsterdam, NL, vol. 498, Mar. 28, 2015 (Mar. 28, 2015), pp. 126-141, XP029220089, ISSN: 0926-860X, DOI: 10.1016/J.APCATA.2015.03.023.
Wang, Hong et al., "Research into eliminating particulate from diesel engine exhaust over zeolite covered with catalysts of perovskite-type oxides", 2009 International Conference on Energy and Environment Technology : ICEET 2009 ; Guilin, China, Oct. 16-18, 2009, IEEE, Piscataway, NJ, USA, Oct. 16, 2009 (Oct. 16, 2009), pp. 493-495, XP031588294, ISBN: 978-0-7695-3819-8.
Yokoi, Toshiyuki , "Characterization of Zeolites by Advanced SEM/STEM Techniques", The Hitachi Scientific Instrument News, vol. 7, Sep. 2016, pp. 17-23.
Yue, Ming B. et al., "Directly Transforming As-Synthesized MCM-41 To Mesoporous MFI Zeolite", Journal of Material Chemistry, vol. 18, No. 17, Mar. 13, 2008, p. 2044.
Zhijie, Wu et al., Hydrothermal synthesis of L TA-encapsulated metal clusters and consequences for catalyst stability, reactivity, and selectivity, Journal of Catalysis, Academic Press, Duluth, MN, US, vol. 311, Jan. 31, 2014 (Jan. 31, 2014), pp. 458-468, XP028612174, ISSN: 0021-9517, DOI: 10.1016/J.JCAT.2013.12.021.
English translation of International Preliminary Report on Patentability for Application No. PCT/JP2018/021095, dated Dec. 3, 2019.
English translation of Written Opinion for Application No. PCT/JP2018/021095, dated Aug. 28, 2018.
International Search Report (EN translation of ISR only) and Written Opinion for Application No. PCT/JP2018/021095, dated Aug. 28, 2018.
Restriction Requirement for U.S. Appl. No. 15/944,098, dated Jun. 17, 2019.
Fujikawa, Takashi , "Current Status and Future Prospects of Petroleum Refining Catalysts", The Nikkan Kogyo Shimbun, Ltd., vol. 65, No. 1, Jan. 1, 2017, p. 22.
Fumoto, Eri et al., "Catalytic Cracking of Heavy Oil With Iron Oxide-Based Catalysts Using Hydrogen and Oxygen Species From Steam", Journal of the Japan Petroleum Institute, vol. 58, No. 5, Feb. 25, 2015, 329-335.

(56) References Cited

OTHER PUBLICATIONS

Haruta, Masatake, "Low-Temperature Combustion Catalysts Mainly for Co Oxidation", Journal of The Japan Petroleum Institute, vol. 37, No. 5, Sep. 1, 1994, pp. 480-491.
Ichikawa, Masaru et al., "Advanced Technology of Methane Chemical Conversion", CMC Publishing Co., Ltd., Jan. 2008.
Ismagilov, Z.R. et al., "Structural Changes of Mo/ZSM-5 Catalysts During the Ethane Dehydroaromatization", Eurasian Chemico-Technological Journal, Journal 12, Nov. 2009, 9-16.
Laprune, David et al., "Highly Dispersed Nickel Particles Encapsulated in Multi-Hollow Silicalite-1 Single Crystal Nanoboxes: Effects of Siliceous Deposits and Phosphorous Species on the Catalytic Performances", ChemCatChem, vol. 9, Issue 12, dated Feb. 18, 2017, pp. 2297-2307.
Muroi, Takajyo, "Development Trends of Methane Chemistry Catalysts", Catalyst Round-table Conference News, No. 96, Nov. 1, 2016.
Muroi, Takashiro, "Reverse Water Gas Shift Catalysts", Industrial Catalyst News, No. 107, Aug. 1, 2017, 2 pages.
Sasaki, Makoto et al., "Templating Fabrication of Platinum Nanoparticles and Nanowires Using the Confined Mesoporous Channels of FSM-16—Their Structural Characterization and Catalytic Performances in Water Gas Shift Reaction", Journal of Molecular Catalysis A: Chemical, vol. 141, No. 1/3, May 6, 1999, p. 223-240.
Wu, Zhijie et al., "Hydrothermal Synthesis of LTA-Encapsulated Metal Clusters and Consequences for Catalyst Stability, Reactivity, and Selectivity", Journal of Catalysis, vol. 311, dated Jan. 31, 2014, pp. 458-468.
Cho, Hong J et al., "Zeolite-Encapsualted Pt Nanoparticlles for Tandem Catalysis", J. Am. Chem. Soc., Sep. 24, 2018, 13514-13520.
Li, Peijun et al., "Ultrastable Perovskite-Zeolite Composite Enabled by Encapsulation and In Situ Passivation", Angewandte Chemie International Edition vol. 59, Issue 51, Sep. 5, 2020, 23300-23306.
Wang, Junwen et al., "In Situ Encapsulated Pt Nanoparticles Dispersed in Low Temperature Oxygen for Partial Oxidation of Methane to Syngas", Catalysts, Aug. 27, 2019, 720-734.
Newsam, J.M., "The Zeolite Cage Structure", Science, Mar. 7, 1986, New Series, vol. 231, No. 2742, pp. 1093-1099 (Year: 1986).
Wen, et al., "Enhanced catalytic performance of Co/MFI by hydrothermal treatment", Catalysis Letters vol. 86, Nos. 1-3, Mar. 2003.
[English Translation] Notice of Reasons for Refusal dated Feb. 7, 2022 for Japanese Patent Application No. 2019-521334; pp. all.
[English Translation] Notice of Reasons for Refusal dated Feb. 7, 2022 for Japanese Patent Application No. 2019-521335; pp. all.
[English Translation] Notice of Reasons for Refusal dated Feb. 7, 2022 for Japanese Patent Application No. JP2019-521325; pp. all.
[English Translation] Notice of Reasons for Refusal dated Mar. 16, 2022 for Japanese Patent Application No. 2019-521322; pp. all.
[English Translation] Notice of Reasons for Refusal dated Mar. 16, 2022 for Japanese Patent Application No. 2019-521331; pp. all.
[English Translation] Notice of Reasons for Refusal dated Mar. 28, 2022 for Japanese Patent Application No. 2019-521324; pp. all.
[English Translation] Saudi Arabian Office Action dated Jan. 27, 2022 for Saudi Arabian Patent Application No. 619410663; pp. all.
Do, Trong-On, et al., "Zeolite Nanoclusters Coated onto the Mesopore Walls of SBA-15", J. Am. Chem. Soc. vol. 126, No. 44, 2004, pp. 14324-14325.
Cai et al. "Gold Nanoclusters Confined in a Supercage of Y Zeolite for Aerobic Oxidation of HMF under Mild Conditions", Chem. Rur. J, 2013, 19, pp. 14215-14223.
Corma et al. "A zeolite with interconnected 8-, 10-, and 12-ring pores and its unique catalytic selectivity", Nature Materials, vol. 2, Jun. 22, 2003, pp. 493-499.
Corma et al. "ITQ-15: The First ultralarge pore zeolite with a bi-directional pore system formed by intersecting 14- and 12-ring channels, and its catalytic implications", Chem. Commun., May 18, 2004, pp. 1356-1357.
Kalogeras et al. "Electrical Properties of Zeolitic Catalysts", Defect and Diffusion Forum vol. 164, Sep. 1998, pp. 1-36.
Mitra et al. "Molecular dynamics using quasielastic neutron scattering", Current Science, vol. 84, No. 5, Mar. 2003; pp. 653-662.
Nan Jiang et al. "The Adsorption Mechanisms of Organic Micropollutants on High-Silica Zeolites Causing S-Shaped Adsorption Isotherms: An Experimental and Monte Carlo Simulations Study", Chemical Engineering Journal; Nov. 2019; pp. all.
English machine translation of JP 2000-511107 A, entitled "Metal-containing zeolite catalyst, its preparation and use for the conversion of hydrocarbons".
English machine translation of JPH0796195 A, entitled "Exhaust Gas Purification Catalyst" dated Sep. 29, 1993.
https://sites.engineering.ucsb.edu/~jbraw/chemreacfun/ch7/slides-masswrxn-2up.pdf. College of Engineering, UC Santa Barbara accessed Apr. 26, 2021.
Dai, Chengyi et al., "Hollow zeolite-encapsulated Fe—Cu bimetallic catalysts for phenol degradation", Catalysis Today, Elsevier, Amsterdam, NL, vol. 297, Feb. 7, 2007 (Feb. 7, 2017), pp. 335-343, XP085215768, ISSN: 0920-5861, DOI: 10.1016/J.CATTOD.2017.02.001.
Li, Shiwen et al., "Diffusion Driven Selectivity in Oxidation of Co in Presence of Propylene Using Zeolite Nano Shell as Membrane", ACS Catalysis, vol. 4, No. 12, Dec. 2014, pp. 4299-4303.
Li, Shiwen et al., "Diffusion-Driven Selectivity in Oxidation of Co in the Presence of Propylene Using Zeolite Nano Shell as Membrane", ACS Catalysis, vol. 4, No. 12, Nov. 2014.
English Translation of CN 102247887(A).
Wang, D Y. et al., Study on methane aromatization over MoO3/HMCM-49 catalyst, 2004, Catalysis Today, 93-95, Jul. 2, 2004, 75-80.
[English Translation] First Office Action dated Apr. 20, 2022 for Chinese Patent Application No. 201880035803.7; pp. all.
[English Translation] Li, Jinlin, et al., "SBA-16 with Different Pore Size Supported Cobal Catalyst for Fischer-Tropsch Synthesis", Journal of South-Central University for Nationalities (National Science Edition); vol. 34 No. 4, Key Laboratory of Catalysis and Materials Science of the State, Ethnic Affairs Commission & Ministry of Education, Dec. 2015; pp. all.
[English Translation] Liu, Quansheng, et al., "Progress in Water-Gas-Shift Catalysts", Progress in Chemistry; vol. 17 No. 3; Institute of Chemical Engineering, Inner Mongolia University of Technology, Hohhot 010062, China, May 2005; pp. all.
[English Translation] First Office Action dated May 16, 2022 for Chinese Patent Application No. 201880036071.3; pp. all.
[English Translation] First Office Action dated May 5, 2022 for Chinese Patent Application No. 201880036312.4; pp. all.
[English Translation] First Office Action dated May 7, 2022 for Chinese Patent Application No. 201880035210.0; pp. all.
[English Translation] Notice of Reasons for Refusal dated Jun. 6, 2022 for Japanese Patent Application No. 2019-521326; pp. all.
First Office Action Dated May 6, 2022 for Australian Patent Application No. 2021202968; pp. all.
Dai, Chengyi, et al., "Hollow Zeolite encapsulated Ni-Pt bimetals for sintering and coking resistant dry reforming of methane", Journal of Materials Chemistry A, Jan. 1, 2015, 9 pages.
[Partial English Translation] Zhang, Yicheng, et al., "Advances in the catalysis of methanol to aromatics reaction", Chemical Industry and Engineering Progress, vol. 35 No. 3, Mar. 5, 2016, pp. 801-806.
[English Abstract] Zhang, Lian-Zhong, et al., "Preparation of Phenol and Acetone with Solid Acid Catalyst", [With Chemical World, Mar. 16, 2012, pp. 487-490.
[English Translation] First Office Action dated Jul. 5, 2022 for Chinese Patent Application No. 201880035017.7.
[English Translation] First Office Action dated Jun. 29, 2022 for Chinese Patent Application No. 201880036388.7.
[English Translation] First Office Action dated Jun. 27, 2022 for Chinese Patent Application No. 201880035525.5.
Hosseinpour, Negahdar, et al., "Cumene cracking activity and enhanced regeneration of FCC catalystscomprising HY-zeolite and LaBO3(B=Co, Mn, and Fe) perovskites", Applied Catalysis A, vol. 487,, Oct. 2014, pp. 26-35.
Laprune, David, et al., "Highly Dispersed Nickel Particles Encapsulated in Multihollow Silicalite-1 Single Crystal Nanoboxes: Effects

(56) References Cited

OTHER PUBLICATIONS of Siliceous Deposits and Phosphorous Species on the Catalytic Performances", ChemCatChem, Sep. 2017, pp. 2297-2307.
Liang, Wenping, et al., "Surfactant Applications in Dispersion Systems", China Light Industry Press, Feb. 2003.
Roque-Malherbe, Rolando M.A., "Adsorption and Diffusion in Nanoporous Materials", Materials Chemistry, Mar. 5, 2007.
[English Translation] Notice of Reasons of Refusal dated Jun. 28, 2022 for Japanese Patent Application No. 2019-521318; pp. all.
[English Translation] Notice of Reasons for Refusal dated Jun. 28, 2022 for Japanese Patent Application No. 2019-521319; pp. all.
[English Translation] Notice of Reasons for Refusal dated Jun. 28, 2022 for Japanese Patent Application No. 2019-521320; pp. all.
[English Translation] Notice of Reasons for Refusal dated Jun. 28, 2022 for Japanese Patent Application No. 2019-521321; pp. all.
[English Translation] First Office Action dated Jul. 11, 2022 for Chinese Patent Application No. 201880036382.X.
[English Translation] First Office Action dated Jul. 13, 2022 for Chinese Patent Application No. 201880035026.6.
[English Translation] First Office Action mailed Aug. 3, 2022 for Chinese Patent Application No. 201880035569.8, pp. all.
[English Translation] First Office Action mailed on Aug. 3, 2022 for Chinese Patent Application No. 201880036313.9, pp. all.
[English Translation] Notice of Reasons for Refusal mailed on Aug. 16, 2022 for Japanese Patent Application No. 2019-521324, pp. all.
[English Translation] Notice of Reasons for Refusal mailed on Aug. 3, 2022 for Japanese Patent Application No. 2019-521322, pp. all.
[English Translation] Notice of Reasons for Refusal mailed on Aug. 3, 2022 for Japanese Patent Application No. 2019-521331, pp. all.
[English Translation] The First Office Action dated Jul. 20, 2022 for Chinese Patent Application No. 201880035173.3, pp. all.
[English Translation] The First Office Action dated Jul. 20, 2022 for Chinese Patent Application No. 201880035360.1, pp. all.
[English Translation] "Preparation and Application of Molecular Sieves", Edited by Shanghai Reagent Factory, Jun. 1976, pp. all.
Dai, Chengyi et al., "Synthesis of Hollow Nanocubes and Macroporous Monoliths of Silicalite-1 by Alkaline Treatment", Chemistry of Materials, Oct. 7, 2013, pp. 4197-4205.
Miao, Tao et al., "Highly dispersed nickel within mesochannels of SBA-15 for CO methanation with enhanced activity and excellent thermostability", Fuel, Journal vol. 188, No. 12; homepage: www.elsevier.com/locate/fuel, 2017, pp. 267-276.
[English Translation] Notice of Reasons for Refusal mailed on Sep. 27, 2022 for Japanese Patent Application No. 2019-521325; pp. all.
[English Translation] Notice of Reasons for Refusal mailed on Sep. 27, 2022 for Japanese Patent Application No. 2019-521334; pp. all.
[English Translation] Notice of Reasons for Refusal mailed on Sep. 27, 2022 for Japanese Patent Application No. 2019-521335; pp. all.
[English Translation] Notice of Reasons for Refusal for Japanese Patent Application No. 2019-521325 dated Nov. 25, 2022, pp. all.
[English Translation] Second Office Action for Chinese Patent Application No. 201880035803.7 dated Nov. 10, 2022, pp. all.
[English Translation] Second Office Action for Chinese Patent Application No. 201880036312.4 dated Nov. 10, 2022, pp. all.
[English Translation] Zhong, Bangke, "Catalysis i Fine chemical process", Sinopec Press; ISBN 7-80164-251-1, Aug. 2002, 4 pages.
[English Translation] Second Office Action dated Dec. 23, 2022 in CN 201880035210.0; pp. all.
[English Translation] Second Office Action dated Jan. 5, 2023 in CN Application No. 201880035525.5; pp. all.
Second Office Action dated Jan. 18, 2023 in CN Application No. 201880036313.9; pp. all.
Decision of Refusal for Japanese Patent Application No. 2019-521318, dated Feb. 1, 2023, pp. all.
Decision of Refusal for Japanese Patent Application No. 2019-521319, dated Feb. 1, 2023, pp. all.
Notice of Reasons for Refusal for Japanese Patent Application No. 2019-521320, dated Feb. 1, 2023, pp. all.
Notice of Reasons for Refusal for Japanese Patent Application No. 2019-521321, dated Feb. 1, 2023, pp. all.
Office Action mailed Dec. 18, 2022 for SA Application No. 519410677; pp. all.
Office Action mailed Dec. 18, 2023 for SA Application No. 519410673; pp. all.
Office Action mailed Dec. 26, 2022 for SA Application No. 519410680; pp. all.
Second Office Action dated Jan. 20, 2023 for CN Application No. 201880035360.1; pp. all.
Second Office Action mailed Jan. 12, 2023 for CN Application No. 201880036382.X; pp. all.
Second Office Action mailed Jan. 19, 2023 for CN Application No. 201880035017.7; pp. all.
Second Office Action mailed Jan. 20, 2023 for CN Application No. 201880035026.6, pp. all.
[English Translation] Third Office Action mailed Mar. 8, 2023 in CN Application No. 201880036312.4; pp. all.
[English Translation] Notice of Reasons for Refusal mailed Mar. 22, 2023 in JP Application No. 2019-521324; pp. all.
[English Translation] Notice of Reasons for Refusal for Japanese Patent Application No. 2019-521322 dated Apr. 4, 2023, pp. all.
[English Translation] Notice of Reasons for Refusal for Japanese Patent Application No. 2019-521325 dated Apr. 4, 2023, pp. all.
[English Translation] Notice of Reasons for Refusal for Japanese Patent Application No. JP-2019-521335 dated Apr. 4, 2023, pp. all.
[English Translation] Notice of Reasons for Refusal for Japanese Patent Application No. 2019-521331 dated Apr. 4, 2023, pp. all.
[English Translation] Second Office Action mailed Feb. 18, 2023 in CN Application No. 201880035173.3; pp. all.
[English Translation] Second Office Action mailed Feb. 24, 2023 in CN Application No. 201880035569.8; pp. all.
[English Translation] Third Office Action mailed Mar. 8, 2023 for CN Application No. 201880035803.7; pp. all.
[English Translation] Third Office Action dated Mar. 8, 2023 in CN Application No. 201880036312.4; pp. all.
Communication pursuant to Article 94(3) EPC for European Patent Application No. 18808807.4 dated Jul. 11, 2023, pp. all.
Communication pursuant to Article 94(3) EPC for European Patent Applicaiton No. 18809577.2, date Jul. 10, 2023, pp. all.
Decision of Rejection for Chinese Patent Application No. 201880035360.1 dated Jun. 26, 2023, pp. all.
Decision of Rejection for Chinese Patent Application No. 201880036313.9 dated Jun. 27, 2023, pp. all.
Reconsideration Report by Examiner before Appeal for Japanese Patent Application No. 2019-521318 dated Jul. 21, 2023, pp. all.
Decision of Rejection for Chinese Patent Application No. 201880035017.7 dated Aug. 1, 2023, pp. all.
Decision of Rejection for Chinses Patent Application No. 201880035803.7 dated Aug. 10, 2023, pp. all.
Decision of Rejection for Chinese Patent Application No. 201880036312.4 dated Aug. 10, 2023, pp. all.
Decision of Rejection for the Chinese Patent Application No. 201880035026.6 dated Aug. 4, 2023, pp. all.
Decision of Rejection for Chinese Patent Application No. 201880035173.3 dated Sep. 1, 2023, pp. all.
Narayanan, Subramanian, et al., "Structural, morphological and catalytic invenstigations on hierarchical ZSM-5 zeolite hexagonal cubes by surfactant assisted hydrothermal methods", Power Technology 274, 2015, pp. 338-348.

\* cited by examiner

STRUCTURED CATALYST FOR STEAM REFORMING, REFORMING APPARATUS PROVIDED WITH STRUCTURED CATALYST FOR STEAM REFORMING, AND METHOD FOR MANUFACTURING STRUCTURED CATALYST FOR STEAM REFORMING

CROSS REFERENCE TO RELATED APPLICATIONS

This is a continuation application of International Patent Application No. PCT/JP2018/021095 filed May 31, 2018, which claims the benefit of Japanese Patent Application No. 2017-108640 filed May 31, 2017, and the full contents of all of which are hereby incorporated by reference in their entirety.

BACKGROUND

Technical Field

The present disclosure relates to a structured catalyst for steam reforming, a reforming apparatus provided with the structured catalyst for steam reforming, and a method for manufacturing a structured catalyst for steam reforming.

Description of the Related Art

Hydrogen is expected to be a source material for new energy, and is used, for example, in a fixed fuel cell system for which the production in the hydrogen producing apparatus for hydrogen station and the dissemination to household, small and medium establishments, or the like are expected, and thus, on-site production has been discussed.

For example, steam reforming of natural gas, also referred to as steam methane reforming (SMR), is the most large-scale method for producing hydrogen used for industrial ammonia synthesis and for producing large quantities of hydrogen for commercial purposes. In addition, this method is most inexpensive. When a metal catalyst is present at elevated temperature (from 700 to 1100° C.), the steam reacts with methane to produce carbon monoxide and hydrogen.

Recently, in addition to the fuel reforming apparatus that utilizes the steam reforming reaction described above, a reforming apparatus in which partial oxidation reaction and steam reforming reaction are used in combination has been developed mainly for a fuel cell generation apparatus for electric automobile or for portable application that requires a compact and fast startup reforming apparatus (JP 2000-323164 A).

Here, the steam reforming reaction (reaction formula (2) below) is an endothermic reaction that requires thermal energy provided externally, while the partial oxidation reaction (reaction formula (1) below) is an exothermic reaction.

$$CH_4 + \tfrac{1}{2}O_2 \rightarrow 2H_2 + CO \quad (1)$$

$$CH_4 + H_2O \rightarrow 3H_2 + CO \quad (2)$$

Therefore, in the reforming apparatus described above, by concomitantly using the partial oxidation reaction in the same reactor, the reaction can be performed while producing heat required for the steam reforming reaction, and an external heating apparatus is unnecessary, thus the apparatus becomes compact and startup time of the reformer can be shortened.

However, the reforming apparatus described above has a problem in that the combustion reaction occurs due to the partial oxidation reaction, thus even in the presence of a trace amount of oxygen, the catalyst aggregation is caused and the catalyst performance is deteriorated in a short period of time, depending on a temperature history at elevated temperature. Therefore, in the known apparatus and the operating method thereof, performance deterioration of the reformer accompanying degradation of the catalyst occurs over time.

Furthermore, it is thermodynamically advantageous that the steam reforming reaction is performed at elevated temperatures, and a reaction temperature of 700° C. or higher may be required for certain types of hydrocarbon. Therefore, high activity as well as excellent heat resistance, temperature stability at elevated temperature, and a certain degree of strength at elevated temperature are required for the catalyst for steam reforming of hydrocarbons. In the related art, a transition metal carried on a support is commonly used as a catalyst for steam reforming of hydrocarbons. The activity ranking of metal catalysts in the steam reforming of methane ($CH_4$) is Rh, Ru>Ir>Ni, Pt, Pd ("Advanced Technology of Methane Chemical Conversion" written by Masaru Ichikawa et al., CMC Publishing Co., Ltd.,). Among those, the precious metals Rh and Ru are most active, but are costly. In addition, although Ni is relatively inexpensive and commonly used in industry, there is a problem in that the activity and heat resistance are not sufficient when Ni nanoparticles are used as a catalyst in a typical form.

SUMMARY

The present disclosure is related to providing a structured catalyst for steam reforming, a reforming apparatus provided with the structured catalyst for steam reforming, and a method for manufacturing a structured catalyst for steam reforming. The structured catalyst for steam reforming is capable of favorably maintaining catalytic activity by suppressing aggregation of catalyst particles and efficiently producing reformed gas containing hydrogen from a reforming raw material containing hydrocarbon.

The present inventors have found a structured catalyst for steam reforming used for producing reformed gas containing hydrogen from a reforming raw material containing hydrocarbon, and thus completed the present disclosure based on such finding. The structured catalyst for steam reforming includes a support having a porous structure constituted of a zeolite-type compound, and at least one catalytic substance present inside the support. The support includes channels connecting with each other, and the catalytic substance is metal nanoparticles and present at least in the channels of the support, and thus, the structured catalyst for steam reforming capable of favorably maintaining catalytic activity by suppressing aggregation of catalyst particles and efficiently producing reformed gas containing hydrogen from a reforming raw material containing hydrocarbon can be obtained.

In other words, the main configurations of the present disclosure are as follows.

[1] A structured catalyst for steam reforming used for producing, from a reforming raw material containing hydrocarbon, reformed gas containing hydrogen, the structured catalyst including:
  a support having a porous structure constituted of a zeolite-type compound; and
  at least one catalytic substance present inside the support, wherein
  the support includes channels connecting with each other, and the catalytic substance is metal nanoparticles and present at least in the channels of the support.

[2] The structured catalyst for steam reforming according to [1], wherein
the metal nanoparticles are nanoparticles composed of at least one type of metal selected from the group consisting of rhodium (Rh), ruthenium (Ru), iridium (Ir), palladium (Pd), platinum (Pt), iron (Fe), cobalt (Co), and nickel (Ni).

[3] The structured catalyst for steam reforming according to [1] or [2], wherein
the channels include any one of a one-dimensional pore, a two-dimensional pore, and a three-dimensional pore defined by a framework of the zeolite-type compound and an enlarged pore portion having a diameter different from that of any of the one-dimensional pore, the two-dimensional pore, and the three-dimensional pore, and
the catalytic substance is present at least in the enlarged pore portion.

[4] The structured catalyst for steam reforming according to [3], wherein
the enlarged pore portion causes a plurality of pores constituting any one of the one-dimensional pore, the two-dimensional pore, and the three-dimensional pore to connect with each other.

[5] The structured catalyst for steam reforming according to [3] or [4], wherein
a mean particle size of the metal nanoparticles is greater than an average inner diameter of the channels and is less than or equal to an inner diameter of the enlarged pore portion.

[6] The structured catalyst for steam reforming according to any one of [1] to [5], wherein
a metal element (M) of the metal nanoparticles is contained in an amount from 0.5 to 2.5 mass % based on the structured catalyst for steam reforming.

[7] The structured catalyst for steam reforming according to any one of [1] to [6], wherein
the mean particle size of the metal nanoparticles is from 0.08 nm to 30 nm.

[8] The structured catalyst for steam reforming according to [7], wherein the mean particle size of the metal nanoparticles is from 0.4 nm to 11.0 nm.

[9] The structured catalyst for steam reforming according to any one of [1] to [8], wherein
a ratio of the mean particle size of the metal nanoparticles to the average inner diameter of the channels is from 0.05 to 300.

[10] The structured catalyst for steam reforming according to [9], wherein
the ratio of the mean particle size of the metal nanoparticles to the average inner diameter of the channels is from 0.1 to 30.

[11] The structured catalyst for steam reforming according to [10], wherein
the ratio of the mean particle size of the metal nanoparticles to the average inner diameter of the channels is from 1.4 to 3.6.

[12] The structured catalyst for steam reforming according to any one of [2] to [11], wherein
the average inner diameter of the channels is from 0.1 nm to 1.5 nm, and
the inner diameter of the enlarged pore portion is from 0.5 nm to 50 nm.

[13] The structured catalyst for steam reforming according to any one of [1] to [12], further including at least one other catalytic substance held on an outer surface of the support.

[14] The structured catalyst for steam reforming according to [13], wherein
a content of the at least one catalytic substance present inside the support is greater than a content of the at least one other catalytic substance held on the outer surface of the support.

[15] The structured catalyst for steam reforming according to any one of [1] to [14], wherein
the zeolite-type compound is a silicate compound.

[16] A reforming apparatus including the structured catalyst for steam reforming according to any one of [1] to [15].

[17] A method for manufacturing a structured catalyst for steam reforming, the method including the steps of:
calcinating a precursor material (B) obtained by impregnating, with metal containing solution, a precursor material (A) for obtaining a support having a porous structure constituted of a zeolite-type compound;
hydrothermally treating a precursor material (C) obtained by calcinating the precursor material (B); and
performing a reduction treatment of the precursor material (C) that has been hydrothermally treated.

[18] The method for manufacturing a structured catalyst for steam reforming according to [17], wherein
from 50 to 500 mass % of a non-ionic surfactant is added to the precursor material (A) before the calcinating.

[19] The method for manufacturing a structured catalyst for steam reforming according to [17] or [18], wherein
the precursor material (A) is impregnated with the metal containing solution by adding the metal containing solution to the precursor material (A) in multiple portions before the calcinating.

[20] The method for manufacturing a structured catalyst for steam reforming according to any one of [17] to [19], wherein
in impregnating the precursor material (A) with the metal containing solution before the calcinating, an added amount of the metal containing solution added to the precursor material (A), in terms of a ratio of silicon (Si) constituting the precursor material (A) to a metal element (M) contained in the metal containing solution added to the precursor material (A) (a ratio of number of atoms Si/M), is adjusted to from 10 to 1000.

[21] The method for manufacturing a structured catalyst for steam reforming according to [17], wherein
in the hydrothermally treating, the precursor material (C) and a structure directing agent are mixed.

[22] The method for manufacturing a structured catalyst for steam reforming according to [17], wherein the hydrothermally treating is performed under a basic condition.

According to the present disclosure, a structured catalyst for steam reforming capable of favorably maintaining catalytic activity by suppressing aggregation of catalyst particles and efficiently producing reformed gas containing hydrogen from a reforming raw material containing hydrocarbon, and a reforming apparatus using the same can be provided.

BRIEF DESCRIPTION OF DRAWINGS

FIG. 1 is a diagram schematically illustrating a structured catalyst for steam reforming according to an embodiment of the present disclosure in a way that the inner structure thereof can be seen.

FIG. 2 is a partially enlarged cross-sectional view for explaining an example of functions of the structured catalyst for steam reforming of FIG. 1.

DETAILED DESCRIPTION

Figure 1A:
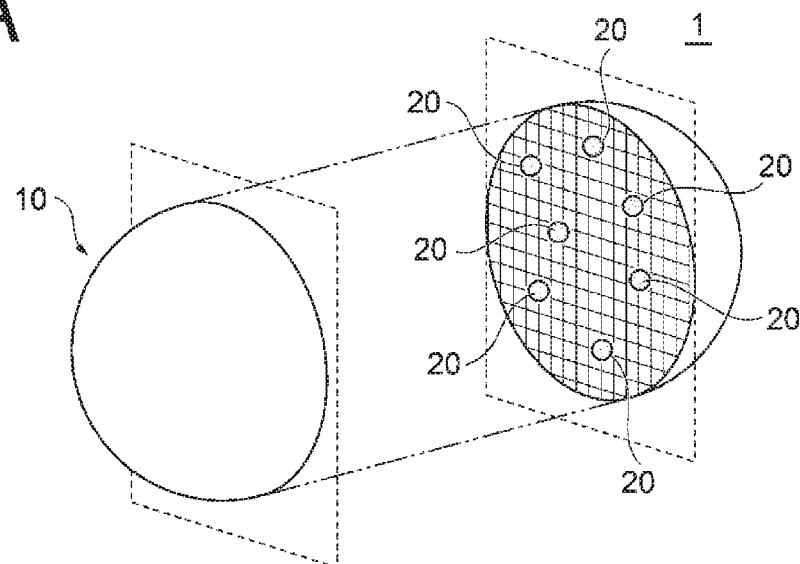
FIG. 1A is a perspective view (partially illustrated in cross-section)
Figure 1B:
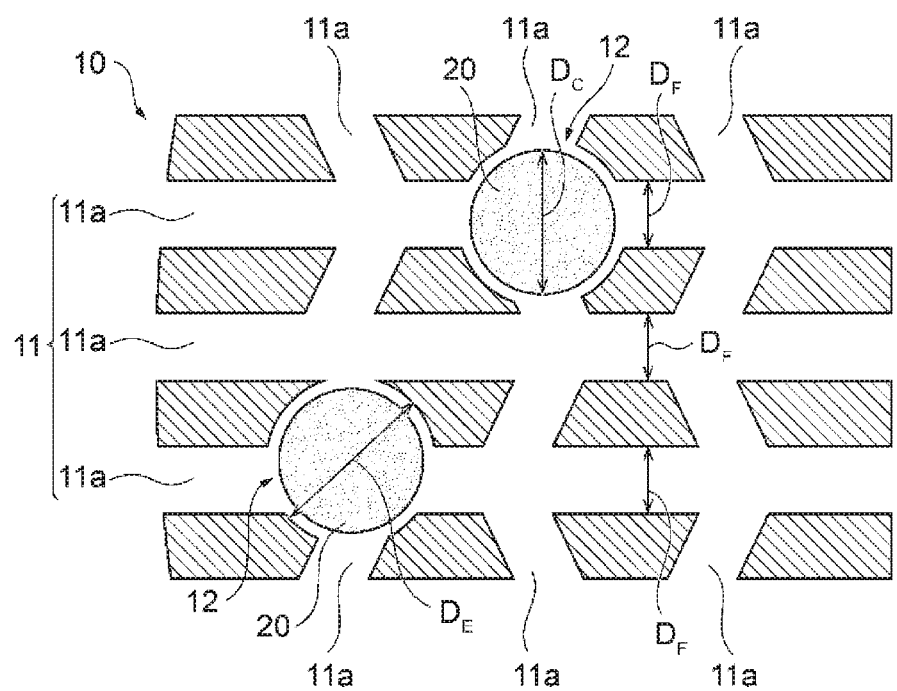
FIG. 1B is a partially enlarged cross-sectional view.

Hereinafter, embodiments of the present disclosure will be described in detail with reference to drawings.
Configuration of Structured Catalyst FIG. 1 is a diagram schematically illustrating a configuration of a structured catalyst for steam reforming (hereinafter, simply referred to as "structured catalyst"), according to an embodiment of the present disclosure, used for producing reformed gas containing hydrogen from a reforming raw material containing hydrocarbon. FIG. 1A is a perspective view (partially illustrated in cross-section), and FIG. 1B is a partially enlarged cross-sectional view. Note that the structured catalyst of FIG. 1 is represented as an example, and the shape, dimension, and the like of each of the configurations according to the present disclosure are not limited to those illustrated in FIG. 1.

As illustrated in FIG. 1A, a structured catalyst 1 includes a support 10 having a porous structure constituted of a zeolite-type compound, and at least one catalytic substance 20 present inside the support 10.

In the structured catalyst 1, a plurality of catalytic substances 20, 20, . . . are embedded in the porous structure of the support 10. The catalytic substances 20 are preferably a substance having catalytic ability (catalytic activity) for a steam reforming reaction (and partial oxidation reaction) when producing reformed gas containing hydrogen from a reforming raw material containing hydrocarbon. Such catalytic substances 20 are metal nanoparticle. The metal nanoparticle will be described in detail below.

The support 10 has a porous structure, and as illustrated in FIG. 1B, preferably has channels 11 connecting with each other by a plurality of pores 11a, 11a, . . . being formed. Here, the catalytic substances 20 are present at least in the channel 11 of the support 10, and are preferably held at least in the channel 11 of the support 10.

With such a configuration, movement of the catalytic substances 20 within the support 10 is restricted, and it is possible to effectively prevent aggregation of the catalytic substances 20, 20. As a result, the decrease in effective surface area of the catalytic substance 20 can be effectively suppressed, and the catalytic activity of the catalytic substance 20 is sustained for a long period of time. In other words, with the structured catalyst 1, the deterioration in catalytic activity due to aggregation of the catalytic substances 20 can be suppressed, and the life time of the structured catalyst 1 can be extended. In addition, due to the long life time of the structured catalyst 1, the replacement frequency of the structured catalyst 1 can be reduced, and the amount of waste of the used structured catalyst 1 can be significantly reduced, which allows saving resources.

Typically, when the structured catalyst is used in fluid, the structured catalyst may receive external force from the fluid. In this case, there is a problem in that if the catalytic substance is only held in an attached state to the outer surface of the support 10, the catalytic substance is easily separated from the outer surface of the support 10 due to the influence of external force from the fluid. In contrast, in the structured catalyst 1, the catalytic substances 20 are held at least in the channel 11 of the support 10, and therefore, even if external force is applied from the fluid, the catalytic substances 20 are less likely to be separated from the support 10. That is, when the structured catalyst 1 is in the fluid, the fluid flows into the channel 11 from the pore 11a of the support 10, so the speed of the fluid flowing through the channel 11 is considered to be slower than the speed of the fluid flowing on the outer surface of the support 10 due to the flow path resistance (frictional force). Due to the influence of such flow path resistance, the pressure applied by the fluid to the catalytic substance 20 held in the channel 11 is lower than the pressure applied by the fluid to the catalytic substance outside of the support 10. As a result, separation of the catalytic substances 20 present inside the support 11 can be effectively suppressed, and the catalytic activity of the catalytic substance 20 can be stably maintained over a long period of time. Note that the flow path resistance as described above is thought to become larger when the channel 11 of the support 10 has a plurality of bends and branches, and the interior of the support 10 becomes a more complex three-dimensional structure.

Furthermore, the channel 11 preferably includes: any one of a one-dimensional pore, a two-dimensional pore, and a three-dimensional pore defined by the framework of the zeolite-type compound; and an enlarged pore portion 12 having a diameter different from that of any one of the one-dimensional pore, the two-dimensional pore, and the three-dimensional pore. In this case, the catalytic substance 20 is preferably at least present, and more preferably, is embedded at least in the enlarged pore portion 12 in the enlarged pore portion 12. As a result, the movement of the catalytic substance 20 within the support 10 is further restricted, and it is possible to further effectively prevent the separation of the catalytic substance 20 and the aggregation of the catalytic substances 20, 20. Embedding refers to a state in which the catalytic substance 20 is included in the support 10. At this time, the catalytic substance 20 and the support 10 are not necessarily in direct contact with each other, but the catalytic substance 20 may be indirectly held by the support 10 with other substances (e.g., a surfactant, etc.) interposed between the catalytic substance 20 and the support 10. Here, the "one-dimensional pore" refers to a tunnel-type or cage-type pore forming a one-dimensional channel, or a plurality of tunnel-type or cage-type pores (a plurality of one-dimensional channels) forming a plurality of one-dimensional channels. Also, the "two-dimensional pore" refers to a two-dimensional channel in which a plurality of one-dimensional channels are coupled two-dimensionally, and the "three-dimensional pore" refers to a three-dimensional channel in which a plurality of one-dimensional channels are coupled three-dimensionally.

Although FIG. 1B illustrates a case in which the catalytic substance 20 is embedded in the enlarged pore portion 12, the catalytic substance 20 is not limited to this configuration only, and may be present in the channel 11 with a portion thereof protruding outward of the enlarged pore portion 12. Furthermore, the catalytic substance 20 may be partially embedded or may be held by, for example, fixing in a portion of the channel 11 other than the enlarged pore portion 12 (e.g., in an inner wall portion of the channels 11).

In addition, the enlarged pore portion 12 preferably causes the plurality of pores 11a, 11a constituting any one of the one-dimensional pore, the two-dimensional pore, and the three-dimensional pore to connect with each other. As a result, a separate channel different from the one-dimensional pore, the two-dimensional pore, or the three-dimensional pore is provided in the interior of the support 10, and thus the function of the catalytic substance 20 can be further exhibited.

In addition, the channel 11 is formed three-dimensionally by including a branch portion or a merging portion in the interior of the support 10, and the enlarged pore portion 12 is preferably provided in the branch portion or the merging portion of the channel 11.

The average inner diameter $D_F$ of the channel 11 formed in the support 10 is calculated from an average value of the short diameter and the long diameter of the pore 11*a* constituting any of the one-dimensional pore, the two-dimensional pore, and the three-dimensional pore, and for example, is from 0.1 nm to 1.5 nm, and preferably from 0.5 nm to 0.8 nm. The inner diameter $D_E$ of the enlarged pore portion 12 is, for example, from 0.5 nm to 50 nm, preferably from 1.1 nm to 40 nm, and more preferably from 1.1 nm to 3.3 nm. The inner diameter $D_E$ of the enlarged pore portion 12 depends on, for example, a fine pore diameter of the precursor material (A) described below and the mean particle size $D_C$ of the catalytic substance 20 to be embedded. The inner diameter $D_E$ of the enlarged pore portion 12 is sized so that the catalytic substance 20 can be embedded.

The support 10 is constituted of a zeolite-type compound. Examples of zeolite-type compounds include zeolite analog compounds such as zeolites (aluminosilicates), cation exchanged zeolites, silicate compounds such as silicalite, aluminoborate salts, aluminoarsenate salts, and germanate salts, and phosphate-based zeolite analogous substances such as molybdenum phosphate. Among these, the zeolite-type compound is preferably a silicate compound.

The framework of the zeolite-type compound is selected from FAU type (Y type or X type), MTW type, MFI type (ZSM-5), FER type (ferrierite), LTA type (A type), MWW type (MCM-22), MOR type (mordenite), LTL type (L type), BEA type (beta type) and the like, and preferably is MFI type, and more preferably ZSM-5. A plurality of pores having a pore diameter corresponding to each framework are formed in the zeolite-type compound, and the maximum pore diameter of MFI type is 0.636 nm (6.36 Å) and the average pore diameter is 0.560 nm (5.60 Å), for example.

The catalytic substance 20 will be described in detail below.

The catalytic substance 20 is metal nanoparticles. There are cases where the metal nanoparticles 20 are primary particles and where the metal nanoparticles 20 are secondary particles formed by aggregation of primary particles, but the mean particle size $D_C$ of the metal nanoparticles 20 is preferably larger than the average inner diameter $D_F$ of the channel 11 and is less than or equal to the inner diameter $D_E$ of the enlarged pore portion 12 ($D_F < D_C \leq D_E$). Such metal nanoparticles 20 are suitably embedded in the enlarged pore portion 12 within the channel 11, and the movement of the metal nanoparticles 20 within the support 10 is restricted. Thus, even when the metal nanoparticles 20 receives external force from the fluid, the movement of the metal nanoparticles 20 within the support 10 is restricted, and it is possible to effectively prevent the metal nanoparticles 20, 20, . . . embedded in each of the enlarged pore portions 12, 12, . . . arranged dispersively in the channel 11 of the support 10 from coming into contact with each other.

In addition, the mean particle size $D_C$ of the metal nanoparticles 20 is preferably from 0.08 nm to 30 nm, more preferably 0.08 nm or larger and less than 25 nm, and even more preferably from 0.4 nm to 11.0 nm, and particularly preferably from 0.8 nm to 2.7 nm for both primary particles and second particles. Furthermore, the ratio ($D_C/D_F$) of the mean particle size $D_C$ of the metal nanoparticle 20 to the average inner diameter $D_F$ of the channel 11 is preferably from 0.05 to 300, more preferably from 0.1 to 30, even more preferably from 1.1 to 30, and particularly preferably from 1.4 to 3.6.

When the catalytic substance 20 is a metal nanoparticle, the metal element (M) of the metal nanoparticle is preferably contained in an amount of 0.5 to 2.5 mass % relative to the structured catalyst 1, and more preferably from 0.5 to 1.5 mass % relative to the structured catalyst 1. For example, when the metal element (M) is Ni, the content of Ni element (mass %) is expressed as {(mass of Ni element)/(mass of all elements of structured catalyst 1)}×100.

The metal nanoparticle may be constituted of a metal that is not oxidized, and may be constituted of a single metal or a mixture of two or more types of metals, for example. Note that in the present specification, the "metal" constituting the metal nanoparticles (as a material) refers to an elemental metal containing one type of metal element (M) and a metal alloy containing two or more types of metal elements (M), and the term is a generic term for a metal containing one or more metal elements.

Examples of such metals include rhodium (Rh), ruthenium (Ru), iridium (Ir), palladium (Pd), platinum (Pt), molybdenum (Mo), tungsten (W), iron (Fe), cobalt (Co), chromium (Cr), cerium (Ce), copper (Cu), magnesium (Mg), aluminum (Al), and nickel (Ni). It is preferable to mainly contain any one or more types of metals described above. In particular, the metal nanoparticles are preferably nanoparticles composed of at least one type of metal selected from the group consisting of rhodium (Rh), ruthenium (Ru), iridium (Ir), palladium (Pd), platinum (Pt), iron (Fe), cobalt (Co), and nickel (Ni), in terms of catalytic activity. From the perspective of catalytic activity, at least one type of metal selected from the group consisting of rhodium (Rh), ruthenium (Ru), iridium (Ir), and nickel (Ni) is more preferable, and nickel (Ni) is particularly preferable from the perspective of both cost and performance.

Furthermore, the ratio of silicon (Si) constituting the support 10 to the metal element (M) constituting the metal nanoparticles 20 (the ratio of number of atoms Si/M) is preferably from 10 to 1000, and more preferably from 50 to 200. In a case where the ratio is greater than 1000, the action as the catalytic substance may not be sufficiently achieved, for example, low activity. On the other hand, in a case where the ratio is smaller than 10, the proportion of the metal nanoparticles 20 becomes too large, and the strength of the support 10 tends to decrease. The metal nanoparticles 20 referred herein are nanoparticles which are present inside the support 10 or are supported, and do not include metal nanoparticles attached to the outer surface of the support 10.

Function of Structured Catalyst

The structured catalyst 1 includes the support 10 having a porous structure and at least one catalytic substance 20 present inside the support 10, as described above. The structured catalyst 1 exhibits catalytic ability based on a function of the catalytic substance 20 when the catalytic substance 20 present inside the support contacts the fluid. In particular, the fluid in contact with an outer surface 10*a* of the structured catalyst 1 flows into the interior of the support 10 through the pore 11*a* formed in the outer surface 10*a* and is guided into the channel 11, travels through the channel 11, and exits from the structured catalyst 1 through another pore 11*a*. In a pathway where the fluid travels through the channel 11, the fluid comes into contact with the catalytic substance 20 held in the channel 11, and thus a catalytic reaction by the catalytic substance 20 occurs. In addition, the structured catalyst 1 has molecular sieving ability due to the support having a porous structure.

Figure 2A:
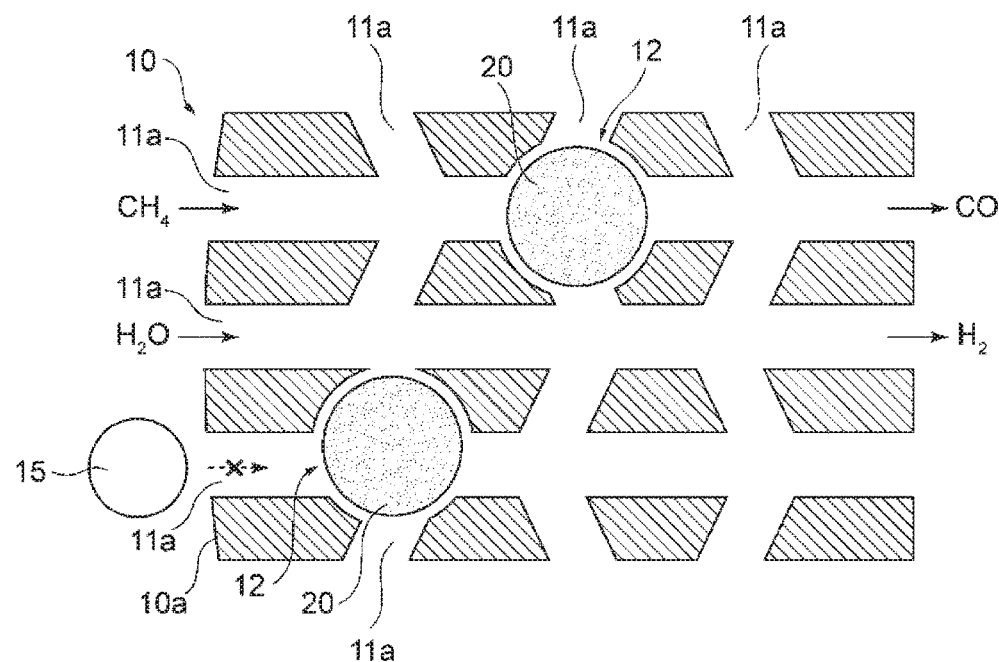
FIG. 2A is a diagram explaining a sieve function.

First, a case in which the fluid is a reforming raw material containing methane as hydrocarbon is described as an example using FIG. 2A for the molecular sieving ability of the structured catalyst 1. Note that the reforming raw material is not limited to the one including methane, and may be the one including a hydrocarbon other than methane, or may be a mixed gas such as natural gas or mixed solution such as petroleum. Examples of the components contained in the reforming raw material include: linear or branched saturated aliphatic hydrocarbons having approximately 1 to 16 carbons such as methane, ethane, propane, butane, pentane, hexane, heptane, octane, nonane, and decane; alicyclic saturated hydrocarbons such as cyclohexane, methylcyclohexane, and cyclooctane; monocyclic and polycyclic aromatic hydrocarbons; city gases; alcohols such as methanol; and various hydrocarbons such as LPG, naphtha, and kerosene.

As illustrated in FIG. 2A, a compound (e.g., methane, water) constituted of molecules having a size that is less than or equal to the pore diameter of the pore 11a, in other words, less than or equal to the inner diameter of the channel 11, can flow into the support 10. On the other hand, a component 15 constituted of molecules having a size exceeding the pore diameter of the pore 11a cannot flow into the support 10. In this way, when the fluid contains a plurality of types of compounds, the reaction of compounds that cannot flow into the support 10 can be restricted and the reaction of compounds capable of flowing into the support 10 can be carried out. In the present embodiment, a steam reforming reaction between methane and water proceeds.

Of the compounds produced in the support 10 by the reaction, only compounds constituted of molecules having a size less than or equal to the pore diameter of the pore 11a can exit from the support 10 through the pore 11a, and are obtained as reaction products. On the other hand, a compound that cannot exit from the support 10 through the pore 11a can be released to the outside of the support 10 when converted into a compound constituted of molecules having a size that is allowed to exit from the support 10. In this way, a specified reaction product can be selectively obtained by using the structured catalyst 1. In the present embodiment, specifically, methane and water are reacted to obtain reformed gas containing carbon monoxide and hydrogen as a reaction product.

Figure 2B:
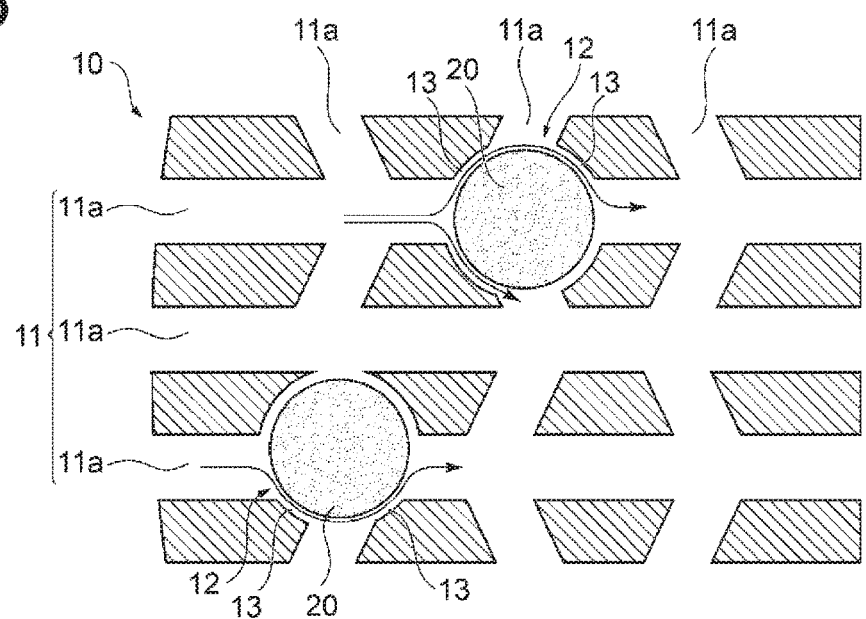
FIG. 2B is a diagram explaining catalytic ability.

In the structured catalyst 1, as illustrated in FIG. 2B, the catalytic substance 20 is embedded in the enlarged pore portion 12 of the channel 11. When the mean particle size $D_C$ of the catalytic substances 20 (metal nanoparticles) is larger than the average inner diameter $D_F$ of the channels 11 and smaller than the inner diameter $D_E$ of the enlarged pore portion 12 ($D_F<D_C<D_E$), a small channel 13 is formed between the metal nanoparticle and the enlarged pore portion 12. Thus, as indicated by arrows in FIG. 2B, the fluid entering the small channel 13 comes into contact with the catalytic substance 20. Since the catalytic substances 20 are embedded in the enlarged pore portions 12, the movement within the support 10 is restricted. Thus, aggregation of the catalytic substances 20 in the support 10 is prevented. As a result, a large contact surface area between the catalytic substance 20 and the fluid can be stably maintained.

In the present embodiment, use of the structured catalyst 1 enables to produce reformed gas containing carbon monoxide and hydrogen by reacting a reforming raw material containing hydrocarbon with water. This catalytic reaction is carried out at an elevated temperature of, for example, 800° C. or higher, but the catalytic substance 20 is hardly affected by heating as the catalytic substance 20 is present inside the support 10. As a result, the deterioration in catalytic activity is suppressed, and the life time of the structured catalyst 1 can be extended.

While FIG. 2 illustrates, as an example, a steam reforming reaction using a reforming raw material containing methane, the structured catalyst 1 according to the present embodiment can be suitably used when reformed gas containing carbon dioxide and hydrogen is produced by using in combination the partial oxidation reaction and the steam reforming reaction performed using a reforming raw material containing methanol, for example. Typically, this reaction system has a problem in that the combustion reaction occurs due to the partial oxidation reaction, thus even in the presence of a trace amount of oxygen, the catalytic substance is easily aggregated, depending on a temperature history at elevated temperature. However, in the structured catalyst 1 according to the present embodiment, the catalytic substance 20 is present inside the support 10, and thus is hardly affected by heating or oxidation. Therefore, when the structured catalyst 1 is used, the deterioration in catalytic activity can be suppressed, and performance deterioration of a reformer using in combination the partial oxidation reaction and the steam reforming reaction can be prevented.

Method for Manufacturing Structured Catalyst

Figure 3:
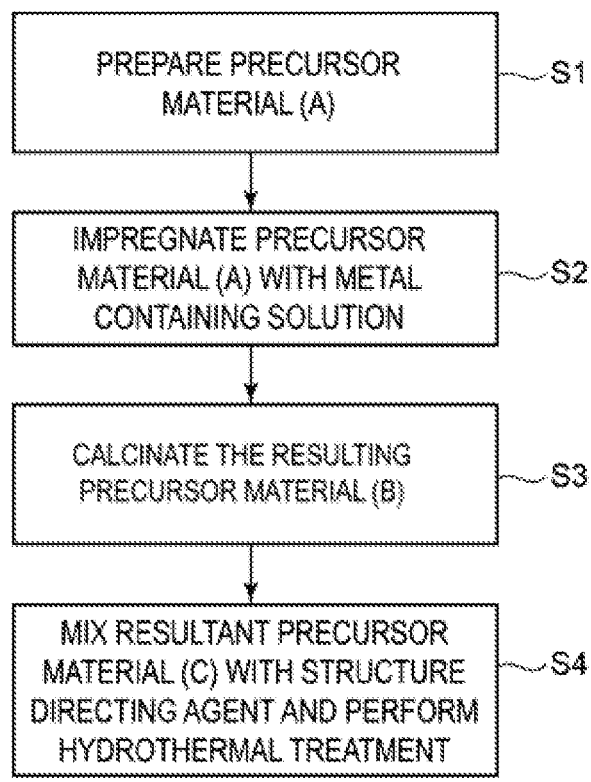
FIG. 3 is a flowchart illustrating an example of a method for manufacturing the structured catalyst for steam reforming of FIG. 1.

FIG. 3 is a flowchart illustrating a method for manufacturing the structured catalyst 1 of FIG. 1. An example of the method for manufacturing a structured catalyst will be described below.

Step S1: Preparation Step

As illustrated in FIG. 3, a precursor material (A) for obtaining the support having a porous structure constituted of the zeolite-type compound is first prepared. The precursor material (A) is preferably a regular mesopore material, and can be appropriately selected according to the type (composition) of the zeolite-type compound constituting the support of the structured catalyst.

Here, when the zeolite-type compound constituting the support of the structured catalyst is a silicate compound, the regular mesopore material is preferably a compound composed of a Si—O skeletal structure in which a fine pore having a fine pore diameter from 1 to 50 nm is uniformly sized and regularly developed one-dimensionally, two-dimensionally, or three-dimensionally. Such a regular mesopore material is obtained as a variety of synthetic materials depending on the synthetic conditions. Specific examples thereof include SBA-1, SBA-15, SBA-16, KIT-6, FSM-16, MCM-41, and the like, and among them, MCM-41 is preferable. Note that the fine pore diameter of SBA-1 is from 10 to 30 nm, the fine pore diameter of SBA-15 is from 6 to 10 nm, the fine pore diameter of SBA-16 is 6 nm, the fine pore diameter of KIT-6 is 9 nm, the fine pore diameter of FSM-16 is from 3 to 5 nm, and the fine pore diameter of MCM-41 is from 1 to 10 nm. Examples of such a regular mesopore material include mesoporous silica, mesoporous aluminosilicate, and mesoporous metallosilicate.

The precursor material (A) may be a commercially available product or a synthetic product. When the precursor material (A) is synthesized, it can be synthesized by a known method for synthesizing a regular mesopore material. For example, a mixed solution including a raw material containing the constituent elements of the precursor material (A) and a molding agent for directing the structure of the precursor material (A) is prepared, and the pH is adjusted as necessary to perform hydrothermal treatment (hydrothermal synthesis). Thereafter, the precipitate (product) obtained by hydrothermal treatment is collected (e.g., filtered), washed and dried as necessary, and then calcinated to obtain a precursor material (A) which is a powdery regular mesopore material. Here, examples of the solvent of the mixed solution that can be used include water, an organic solvent such as alcohol, or a mixed solvent thereof. In addition, the raw material is selected depending on the type of the support, and examples thereof include silica agents such as tetraethoxysilane (TEOS), fumed silica, and quartz sand. In addition, various types of surfactants, block copolymers, and the like can be used as the molding agent, and it is preferably selected depending on the type of the synthetic materials of the regular mesopore material. For example, a surfactant such as hexadecyl trimethyl ammonium bromide is preferable for producing MCM-41. The hydrothermal treatment can be performed at 0 to 2000 kPa at 80 to 800° C. for 5 hours to 240 hours in a closed vessel, for example. The calcination treatment can be performed in air, at 350 to 850° C. for 2 to 30 hours, for example.

Step S2: Impregnating Step

The prepared precursor material (A) is then impregnated with the metal containing solution to obtain a precursor material (B).

The metal containing solution may be a solution containing a metal component (e.g., metal ions) corresponding to the metal element (M) constituting the metal nanoparticles of the structured catalyst, and can be prepared, for example, by dissolving a metal salt containing a metal element (M) in a solvent. Examples of such metal salts include chloride salts, hydroxides, oxides, sulfates, and nitrates. Among these, nitrates are preferable. Examples of the solvent that can be used include water, an organic solvent such as alcohol, or a mixed solvent thereof.

The method for impregnating the precursor material (A) with the metal containing solution is not particularly limited; however, for example, the metal containing solution is preferably added little by little in multiple portions while mixing the powdery precursor material (A) before the calcination step described below. In addition, the surfactant is preferably added to the precursor material (A) as the additive before adding the metal containing solution from the perspective of allowing the metal containing solution to enter into the fine pores of the precursor material (A) more easily. It is believed that such additives serve to cover the outer surface of the precursor material (A) and inhibit the subsequently added metal containing solution from attaching to the outer surface of the precursor material (A), making it easier for the metal containing solution to enter into the fine pores of the precursor material (A).

Examples of such additives include non-ionic surfactants such as polyoxyethylene alkyl ether such as polyoxyethylene oleyl ether, and polyoxyethylene alkylphenyl ether. It is believed that these surfactants do not attach to the interior of the fine pores because the molecular size of these surfactants is too large to enter into the fine pores of the precursor material (A), and thus will not prevent the metal containing solution from entering into the interior of fine pores. As the method for adding the non-ionic surfactant, for example, it is preferable to add from 50 to 500 mass % of the non-ionic surfactant to the precursor material (A) before the calcination step described below. If the added amount of the non-ionic surfactant to the precursor material (A) is less than 50 mass %, the aforementioned suppressing action will not easily occur, and when greater than 500 mass % of the non-ionic surfactant is added to the precursor material (A), the viscosity is too high, which is not preferable. Thus, the added amount of the non-ionic surfactant to the precursor material (A) is a value within the range described above.

Furthermore, the added amount of the metal containing solution added to the precursor material (A) is preferably adjusted as appropriate in consideration of the amount of the metal element (M) contained in the metal containing solution with which the precursor material (A) is impregnated (that is, the amount of the metal element (M) to be present inside the precursor material (B)). For example, before the calcination step described below, the added amount of the metal containing solution added to the precursor material (A), in terms of a ratio of silicon (Si) constituting the precursor material (A) to the metal element (M) contained in the metal containing solution added to the precursor material (A) (the ratio of number of atoms Si/M), is preferably adjusted to from 10 to 1000, and more preferably from 50 to 200. For example, if the surfactant is added to the precursor material (A) as the additive before adding the metal containing solution to the precursor material (A), and when the added amount of the metal containing solution added to the precursor material (A), in terms of the ratio of number of atoms Si/M, is set to be from 50 to 200, from 0.5 to 2.5 mass % of the metal element (M) of the metal nanoparticles can be contained based on the structured catalyst 1. In the state of the precursor material (B), the amount of the metal element (M) present within the fine pores is generally proportional to the added amount of the metal containing solution added to the precursor material (A) in a case where the metal concentration of the metal containing solution, the presence or absence of additives, and other conditions such as temperature, pressure, and the like are the same. The amount of the metal element (M) present inside the precursor material (B) is also in a proportional relationship to the amount of the metal element constituting the metal nanoparticles present inside the support of the structured catalyst. Thus, by controlling the added amount of the metal containing solution added to the precursor material (A) to the range described above, the metal containing solution can be sufficiently impregnated into the fine pores of the precursor material (A), and thus the amount of metal nanoparticles to be present inside the support of the structured catalyst can be adjusted.

After impregnating the precursor material (A) with the metal containing solution, a washing treatment may be performed as necessary. Examples of wash solution that can be used include water, an organic solvent such as alcohol, or a mixed solvent thereof. Furthermore, it is preferable that after the precursor material (A) is impregnated with the metal containing solution and subjected to the washing treatment as necessary, the precursor material (A) is further subjected to the drying treatment. Drying treatments include overnight natural drying and drying at elevated temperature of 150° C. or lower. Note that when calcination treatment described below is performed in the state in which a large amount of moisture contained in the metal containing solution or moisture of the wash solution remains in the precursor material (A), the skeletal structure of the precursor material (A) as the regular mesopore material may be broken, and thus it is preferable to dry the precursor material (A) sufficiently.

Step S3: Calcination Step

Next, a precursor material (C) is produced by calcinating the precursor material (B) obtained by impregnating, with the metal containing solution, the precursor material (A) for obtaining the support having a porous structure constituted of the zeolite-type compound.

The calcination treatment is preferably performed in air, at 350 to 850° C. for 2 to 30 hours, for example. The metal component impregnated into the pores of the regular mesopore material undergoes crystal growth by such a calcination treatment, and metal nanoparticles are formed in the pores.

Step S4: Hydrothermal Treatment Step

A mixed solution of the precursor material (C) and the structure directing agent is then prepared, and the precursor material (C) obtained by calcinating the precursor material (B) is hydrothermally treated to obtain a structured catalyst.

The structure directing agent is a molding agent for directing the skeletal structure of the support of the structured catalyst, and the surfactant can be used for example. The structure directing agent is preferably selected depending on the skeletal structure of the support of the structured catalyst, and for example, surfactants such as tetramethylammonium bromide (TMABr), tetraethylammonium bromide (TEABr), and tetrapropylammonium bromide (TPABr) are suitable.

The mixing of the precursor material (C) and the structure directing agent may be performed during the hydrothermal treatment step or may be performed before the hydrothermal treatment step. Furthermore, the method for preparing the mixed solution is not particularly limited, and the precursor material (C), the structure directing agent, and the solvent may be mixed simultaneously, or the precursor material (C) and the structure directing agent may each be dispersed in different solvents and then these dispersions may be mixed. Examples of the solvent that can be used include water, an organic solvent such as alcohols, or a mixed solvent thereof. In addition, it is preferable that the pH of the mixed solution is adjusted using an acid or a base before performing the hydrothermal treatment.

The hydrothermal treatment can be performed by a known method, and is preferably performed at 0 to 2000 kPa at 80 to 800° C. for 5 hours to 240 hours in a closed vessel, for example. Furthermore, the hydrothermal treatment is preferably performed under a basic condition. Although the reaction mechanism here is not necessarily clear, by performing hydrothermal treatment using the precursor material (C) as a raw material, the skeletal structure of the precursor material (C) as the regular mesopore material becomes increasingly disrupted. However, the action of the structure directing agent forms a new skeletal structure (porous structure) as the support of the structured catalyst while roughly maintaining the position of the metal nanoparticles within the fine pores of the precursor material (C). The structured catalyst obtained in this way includes the support having a porous structure and metal nanoparticles present inside the support, and the support includes a channel in which a plurality of pores connect with each other due to the porous structure, and at least a portion of the metal nanoparticles are present in the channel of the support.

Furthermore, in the present embodiment, in the hydrothermal treatment step, a mixed solution in which the precursor material (C) and the structure directing agent are mixed is prepared, and the precursor material (C) is subjected to hydrothermal treatment; however, the embodiment is not limited thereto. The precursor material (C) may be subjected to hydrothermal treatment without mixing the precursor material (C) and the structure directing agent.

The precipitate (structured catalyst) obtained after the hydrothermal treatment is preferably washed, dried, and calcinated as necessary after recovery (e.g., filtration). Examples of wash solution that can be used include water, an organic solvent such as alcohols, or a mixed solvent thereof. Drying treatments include overnight natural drying and drying at elevated temperature of 150° C. or lower. Note that when calcination treatment is performed in the state in which there is a large amount of moisture remaining in the precipitate, the skeletal structure of the structured catalyst as the support may be broken, and thus it is preferable to dry the precipitate sufficiently. In addition, the calcination treatment can be performed in air, at 350 to 850° C. for 2 hours to 30 hours, for example. During the calcination treatment, the structure directing agent attached to the structured catalyst is burned and removed. Furthermore, the structured catalyst can be used as-is without subjecting the recovered precipitate to calcination, depending on the intended use. For example, in a case where the environment in which the structured catalyst is used is an elevated temperature environment of an oxidizing atmosphere, exposing the structured catalyst to a usage environment for a certain period of time allows the structure directing agent to be burned and removed and, as a result, a structured catalyst similar to that when subjected to calcination treatment can be produced. Thus, the obtained structured catalyst can be used as-is.

The manufacturing method described above is an example in which the metal element (M) contained in the metal containing solution to be impregnated into the precursor material (A) is a metal species that is hardly oxidized (e.g., a precious metal).

When the metal element (M) contained in the metal containing solution to be impregnated into the precursor material (A) is a metal species that is easily oxidized (e.g., Fe, Co, Ni, and the like), a reduction treatment is preferably performed on the hydrothermally treated precursor material (C) after the hydrothermal treatment step (Step S5: Reduction Treatment Step). When the metal element (M) contained in the metal containing solution is a metal species that is easily oxidized, the metal component is oxidized by the heat treatment in the step (Steps S3 and S4) after the impregnating treatment (Step S2). Therefore, metal oxide nanoparticles are present inside the support formed in the hydrothermal treatment step (Step S4). Thus, to obtain a structured catalyst in which metal nanoparticles are present inside the support, it is desirable to subject the recovered precipitate to calcination treatment after the hydrothermal treatment, and then to reduction treatment in a reducing gas atmosphere such as hydrogen gas. By performing the reduction treatment, the metal oxide nanoparticles present inside the support are reduced, and metal nanoparticles corresponding to the metal element (M) constituting the metal oxide nanoparticles are formed. As a result, a structured catalyst in which metal nanoparticles are present inside a support is obtained. Note that such reduction treatment may be performed as necessary, and when the environment in which the structured catalyst is used is a reducing atmosphere, for example, the metal oxide nanoparticles are reduced by exposure to the usage environment for a certain period of time. In this case, a structured catalyst similar to that when subjected to the reduction treatment is obtained, thus the reduction treatment is not necessary.

Variation of Structured Catalyst 1

Figure 4:
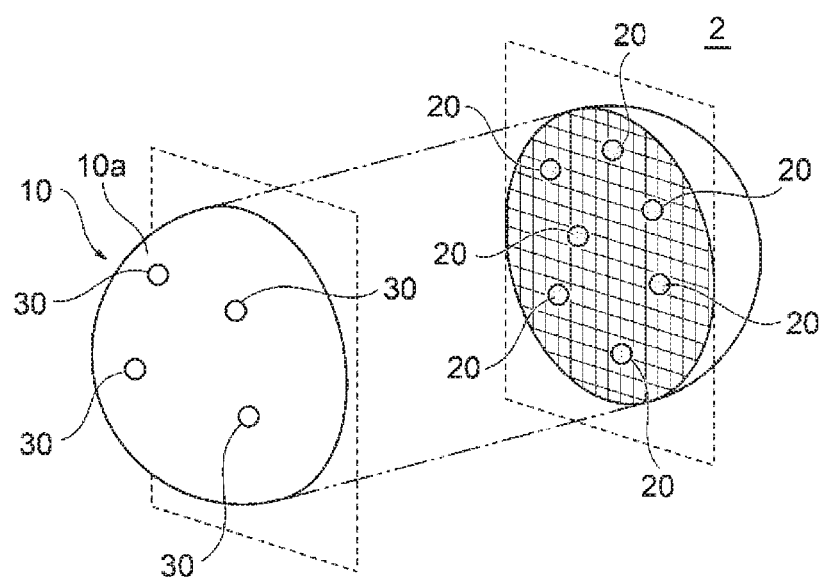
FIG. 4 is a schematic view illustrating a variation of the structured catalyst for steam reforming of FIG. 1.

FIG. 4 is a schematic view illustrating a variation of the structured catalyst 1 of FIG. 1.

Although the structured catalyst 1 of FIG. 1 illustrates the case in which the structured catalyst 1 includes the support 10 and the catalytic substance 20 present inside the support 10, and the configuration thereof is not limited thereto. For example, as illustrated in FIG. 4, a structured catalyst 2 may further include at least one other catalytic substance 30 held on the outer surface 10a of the support 10.

This catalytic substance 30 is a substance that exhibits one or a plurality of catalytic abilities. The catalytic ability of the other catalytic substance 30 may be the same as or different from the catalytic ability of the catalytic substance 20. When both of the catalytic substances 20 and 30 are substances having the same catalytic ability, the material of the other catalytic substance 30 may be the same as or different from the material of the catalytic substance 20. With this configuration, the content of catalytic substances held in the structured catalyst 2 can be increased, and the catalytic activity of the catalytic substance can be further promoted.

In this case, the content of the catalytic substance 20 present inside the support 10 is preferably greater than the content of the at least one other catalytic substance 30 held on the outer surface 10a of the support 10. As a result, the catalytic ability of the catalytic substance 20 held in the interior of the support 10 becomes dominant, and the catalytic ability of the catalytic substance is stably exhibited.

The structured catalyst according to an embodiment of the present disclosure has been described above, but the present disclosure is not limited to the above embodiments, and various modifications and changes are possible based on the technical concept of the present disclosure.

For example, a reforming apparatus provided with the above-described structured catalyst may be provided. Specific examples of the reforming apparatus include: a fuel reforming apparatus that utilizes a steam reforming reaction; a reforming apparatus in which partial oxidation reaction and steam reforming reaction are used in combination that is mainly intended for a fuel cell generation apparatus for electric automobile or for portable application; a stationary fuel cell such as a solid oxide fuel cell (SOFC); and the like. The above-described structured catalyst can be used in a catalytic reaction using such an apparatus.

That is, by supplying hydrocarbon (e.g., a reforming raw material containing hydrocarbon) and steam to the above-described structured catalyst, reformed gas containing hydrogen can be synthesized. Thus, for example, by using the above-described structured catalyst in the reforming apparatus to perform a reforming treatment on the reforming raw material containing hydrocarbon with the reforming apparatus, the effect similar to that described above can be achieved.

EXAMPLES

Examples 1 to 384

Synthesis of Precursor Material (A)

A mixed aqueous solution was prepared by mixing a silica agent (tetraethoxysilane (TEOS), available from Wako Pure Chemical Industries, Ltd.) and a surfactant as the molding agent. After pH adjustment was performed as appropriate, and hydrothermal treatment was performed at 80 to 350° C. for 100 hours in a closed vessel. Thereafter, the produced precipitate was filtered out, washed with water and ethanol, and then calcinated in air at 600° C. for 24 hours. As a result, the precursor material (A) of the type and having the pore diameter shown in Tables 1 to 8 was obtained. Note that the following surfactant was used depending on the type of the precursor material (A) ("Type of Precursor Material (A): Surfactant").

MCM-41: Hexadecyltrimethylammonium bromide (CTAB) (available from Wako Pure Chemical Industries, Ltd.)

SBA-1: Pluronic P123 (available from BASF)

Fabrication of Precursor Materials (B) and (C)

Next, for each of metal elements (M) constituting metal nanoparticles of the types shown in Tables 1 to 8, metal containing aqueous solution was prepared by dissolving a metal salt containing the metal element (M) in water. Note that the following metal salt was used depending on the type of metal nanoparticles ("Metal Nanoparticles: Metal Salt").

Ru: ruthenium chloride (III) hydrate (available from NACALAI TESQUE, INC.)

Ni: nickel nitrate (II) hexahydrate (available from Wako Pure Chemical Industries, Ltd.)

Ir: iridium chloride (III) hydrate (available from Wako Pure Chemical Industries, Ltd.)

Rh: rhodium nitrate (III) solution (available from Wako Pure Chemical Industries, Ltd.)

Next, a metal containing aqueous solution was added to the powdered precursor material (A) little by little in multiple portions, and dried at room temperature (20° C.±10° C.) for 12 hours or longer to produce the precursor material (B).

Note that when the presence or absence of additives shown in Tables 1 to 8 is "Yes", pretreatment in which an aqueous solution of polyoxyethylene (15) oleyl ether (NIKKOL BO-15 V, available from Nikko Chemicals Co., Ltd.) is added as the additive to the precursor material (A) before adding the metal containing aqueous solution, and then the metal containing aqueous solution was added as described above. Note that when the presence or absence of an additive is "No", pretreatment with an additive described above was not performed.

Furthermore, the value obtained by converting the added amount of the metal containing aqueous solution added to the precursor material (A) to a ratio of silicon (Si) constituting the precursor material (A) to a metal element (M) contained in the metal containing aqueous solution (a ratio of number of atoms Si/M) was adjusted to be values shown in Tables 1 to 8.

Next, the precursor material (B) impregnated with the metal containing aqueous solution obtained as described above was calcinated in air at 600° C. for 24 hours and the precursor material (C) was produced.

The precursor material (C) obtained as described above and the structure directing agent shown in Tables 1 to 8 were mixed to produce a mixed aqueous solution, then the hydrothermal treatment was performed thereon under the conditions of at 80 to 350° C., at pH and time shown in Tables 1 to 8 in a closed vessel. Thereafter, the produced precipitate was filtered off, washed with water, dried at 100° C. for 12 hours or longer, and then calcinated in air at 600° C. for 24 hours. The calcinated product was then recovered and subjected to the reduction treatment under the inflow of hydrogen gas at 500° C. for 60 minutes and structured catalysts including the support and metal nanoparticles as a catalytic substance shown in Tables 1 to 8 were produced (Examples 1 to 384).

Comparative Example 1

In Comparative Example 1, cobalt oxide powder (II, III) having a mean particle size of 50 nm or less (available from Sigma-Aldrich Japan LLC) was mixed with MFI type silicalite, and similarly to Examples, hydrogen reduction treatment was performed. As a result, a structured catalyst in which cobalt nanoparticles were attached as the catalytic substance to the outer surface of the silicalite as the support was produced. MFI type silicalite was synthesized in the similar manner to Examples 52 to 57 except for a step of adding a metal.

Comparative Example 2

In Comparative Example 2, MFI type silicalite was synthesized in the similar manner to Comparative Example 1 except that the step of sticking the cobalt nanoparticles was omitted.

Evaluation

Various characteristics evaluations were performed on the structured catalysts of Examples and the silicalite of Comparative Examples under the conditions described below.

A. Cross Sectional Observation

Samples for observation were produced using a pulverization method for the structured catalysts of Examples and the silicalite of Comparative Examples, and cross-sectional observation was performed using a transmission electron microscope (TEM) (TITAN G2, available from FEI).

As a result, it was confirmed that, in the structured catalysts of Examples, the catalytic substance is present and held in the interior of the support constituted of silicalite or zeolite. On the other hand, in the silicalite of Comparative Example 1, the metal nanoparticles were only attached to the outer surface of the support and were not present in the interior of the support.

In addition, of the Examples described above, the structured catalyst in which the metal is Ni nanoparticles was cut by FIB (focused ion beam) processing to expose a cross section, and cross-sectional elemental analysis was performed using SEM (SU8020, available from Hitachi High-Technologies Corporation) and EDX (X-Max, available from Horiba, Ltd.). As a result, element Ni was detected from the interior of the support.

It was confirmed that Ni nanoparticles were present in the interior of the support from the results of the cross-sectional observation using TEM and SEM/EDX.

B. Average Inner Diameter of Channel of Support and Mean Particle Size of Catalytic Substance In the TEM image taken in the cross sectional observation performed in evaluation A above, 500 channels of the support were randomly selected, and the respective major diameters and minor diameters were measured, and the respective inner diameters were calculated from the average values (N=500), and then the average value of the inner diameters was determined as the average inner diameter $D_F$ of the channel of the support. Also for the catalytic substances, 500 catalytic substances were randomly selected from the TEM image, the respective particle sizes were measured (N=500), and the average value thereof was determined as the mean particle size $D_C$ of the catalytic substance. The results are shown in Tables 1 to 8.

In addition, SAXS (small angle X-ray scattering) analysis was performed to reveal the mean particle size and dispersion state of the catalytic substance. The SAXS measurement was performed using a Spring-8 beam line BL19B2. The obtained SAXS data was fitted with a spherical model using the Guinier approximation method, and the particle size was calculated. The particle size was measured for the structured catalyst in which the metal is Ni nanoparticles. Furthermore, as a comparative reference, a commercially available iron nanoparticles (available from Wako) was observed and measured on SEM.

As a result, in commercially available products, various sizes of iron nanoparticles were randomly present in a range of particle sizes of approximately 50 nm to 400 nm, whereas in the structured catalysts of each Example having an mean particle size of 1.2 nm to 2.0 nm determined from the TEM image, scattering peaks with particle sizes of 10 nm or less were detected even in the measurement results of SAXS. From the results of SAXS measurement and the SEM/EDX cross sectional measurement, it was found that catalytic substances having a particle size of 10 nm or less were present in the interior of the support in a highly dispersed state and the catalytic substances are uniform in particle size.

C. Relationship Between Added Amount of Metal Containing Solution and Amount of Metal Embedded in Interior of Support A structured catalyst in which metal nanoparticles were embedded in the interior of the support at added amount of the ratio of number of atoms Si/M=50, 100, 200, 1000 (M=Ru, Ni, Ir, Rh) was produced, and then the amount of metal (mass %) embedded in the interior of the support of the structured catalyst produced at the above added amount was measured. Note that in the present measurement, a structured catalyst having the ratio of number of atoms Si/M=100, 200, 1000 was produced by adjusting the added amount of the metal containing solution in a similar manner to the structured catalyst having the ratio of number of atoms Si/M=100, 200, 1000 of each of Examples 1 to 384, and a structured catalyst having the ratio of number of atoms Si/M=50 was produced in a similar manner to the structured catalyst having the ratio of number of atoms Si/M=100, 200, 1000 except that the added amount of the metal containing solution was changed.

The amount of metal was quantified by ICP (high-frequency inductively coupled plasma) alone or in combination with ICP and XRF (X-ray fluorescence analysis). XRF (energy dispersive X-ray fluorescence analyzer "SEA1200VX", available from SSI Nanotechnology) was performed under conditions of a vacuum atmosphere, an accelerating voltage 15 kV (using a Cr filter), or an accelerating voltage 50 kV (using a Pb filter).

XRF is a method for calculating the amount of metal present based on fluorescence intensity, and XRF alone cannot calculate a quantitative value (in terms of mass %). Therefore, the metal content of the structured catalyst to which the metal was added at Si/M=100 was determined by ICP analysis, and the metal content of the structured catalyst to which the metal was added at Si/M=50 and less than 100 was calculated based on XRF measurement results and ICP measurement results.

As a result, it was confirmed that the amount of metal embedded in the structured catalyst increased as the added amount of the metal containing solution increased, at least within a range that the ratio of numbers of atom Si/M was from 50 to 1000.

D. Performance Evaluation

The catalytic ability of the catalytic substance was evaluated for the structured catalysts of Examples and the silicalite of Comparative Examples. The results are shown in Tables 1 to 10.

1. Catalytic Activity

The catalytic activity was evaluated under the following conditions.

First, 0.2 g of the structured catalyst was filled in an atmospheric pressure flow type reactor, and using stream as a carrier gas (5 mL/min) and JIS1 kerosene as a reforming raw material, a steam reforming reaction was performed for 2 hours at 580° C.

After completion of the reaction, composition analysis for the recovered produced gas was performed by using gas chromatography mass spectrometry (GC/MS). Note that TRACE 1310GC (available from Thermo Fisher Scientific K.K., detector: thermal conductivity detector) was used as the analysis apparatus for the produced gas.

Based on the results of the above composition analysis, the conversion ratio to C1 (CO, $CO_2$, and $CH_4$) was calculated. Note that the C1 conversion ratio was calculated using Equation (1) below.

$$C1 \text{ conversion ratio } (\%) = (A/B) \times 100 \quad (1)$$

In Equation (1), A represents a total of CO molar flow rate, $CO_2$ molar flow rate, and $CH_4$ molar flow rate at the reactor outlet, and B represents carbon molar flow rate of the kerosene at the reactor inlet side.

In the examples, when the C1 conversion ratio is 40% or more, it is determined that catalytic activity is excellent, and considered as "A". When it is 30% or more and less than 40%, it is determined that catalytic activity is good, and considered as "B". When it is 20% or more and less than 30%, it is determined that catalytic activity is not good, but is pass level (acceptable), and considered as "C". When it is less than 20%, it is determined that catalytic activity is poor (not pass), and considered as "D".

2. Durability (Life Time)

The durability was evaluated under the following conditions.

First, the structured catalyst used in evaluation (1) was recovered and heated at 650° C. for 12 hours to produce a structured catalyst after heating. Next, a steam reforming reaction using JIS1 kerosene as the reforming raw material was performed by the similar method to that performed in the evaluation (1) using the obtained structured catalyst after heating, and then composition analysis of the produced gas was performed in the similar manner in the evaluation (1).

Based on the obtained analytical results, the C1 conversion ratio (%) was determined in the similar manner to the evaluation (1). Furthermore, comparison of degrees of maintaining of the C1 conversion ratio was performed by comparing the C1 conversion ratio of the structured catalyst after heating with the C1 conversion ratio of the structured catalyst before heating (the C1 conversion ratio determined in the evaluation (1)). Specifically, the percentage (%) of the C1 conversion ratio of the structured catalyst after heating (C1 conversion ratio determined in the evaluation (2)) to the C1 conversion ratio of the structured catalyst before heating (C1 conversion ratio determined by the evaluation (1)) was calculated.

In the examples, when C1 conversion ratio of the structured catalyst after heating (C1 conversion ratio determined in the evaluation (2)) is maintained at least 80% compared to the C1 conversion ratio of the structured catalyst before heating (C1 conversion ratio determined in the evaluation (1)), it is determined that durability (heat resistance) is excellent, and considered as "A". When it is maintained 60% or more and less than 80%, it is determined that durability (heat resistance) is good, and considered as "B". When it is maintained 40% or more and less than 60%, it is determined that durability (heat resistance) is not good, but is pass level (acceptable), and considered as "C". When it is reduced below 40%, it is determined that durability (heat resistance) is poor (not pass), and considered as "D".

Performance evaluations similar to evaluations (1) and (2) were also performed on Comparative Examples 1 and 2. Note that Comparative Example 2 contains the support only, and do not contain the catalytic substance. Therefore, in the performance evaluation described above, only the support of Comparative Example 2 was charged in place of the structured catalyst. The results are shown in Table 8.

TABLE 1

| | Manufacturing Conditions of Structured Catalyst | | | | | | |
|---|---|---|---|---|---|---|---|
| | Precursor Material (A) | | Addition to Precursor Material (A) | | Conditions of Hydrothermal Treatment using Precursor Material (C) | | |
| | | | | Conversion Ratio of Added Amount of Metal Containing Solution | | | |
| No. | Type | Pore Diameter (nm) | Presence or Absence of Additives | (Ratio of Number of Atoms) Si/M | Type of Structure Directing Agent | pH | Time (h) |
| Example 1 | MCM-41 | 1.3 | Yes | 1000 | TEABr | 12 | 120 |
| Example 2 | | | | 500 | | | |
| Example 3 | | | | 200 | | | |
| Example 4 | | | | 100 | | | |
| Example 5 | | 2.0 | | | | | |
| Example 6 | | 2.4 | | | | | |
| Example 7 | | 2.6 | | | | | |
| Example 8 | | 3.3 | | | | | |
| Example 9 | | 6.6 | | | | | |
| Example 10 | SBA-1 | 13.2 | | | | | |
| Example 11 | | 19.8 | | | | | |
| Example 12 | | 26.4 | | | | | |
| Example 13 | MCM-41 | 1.3 | No | 1000 | | | |
| Example 14 | | | | 500 | | | |
| Example 15 | | | | 200 | | | |
| Example 16 | | | | 100 | | | |
| Example 17 | | 2.0 | | | | | |
| Example 18 | | 2.4 | | | | | |

TABLE 1-continued

| | | | | | | | |
|---|---|---|---|---|---|---|---|
| Example 19 | | 2.6 | | | | | |
| Example 20 | | 3.3 | | | | | |
| Example 21 | | 6.6 | | | | | |
| Example 22 | SBA-1 | 13.2 | | | | | |
| Example 23 | | 19.8 | | | | | |
| Example 24 | | 26.4 | | | | | |
| Example 25 | MCM-41 | 1.1 | Yes | 1000 | | 11 | 72 |
| Example 26 | | | | 500 | | | |
| Example 27 | | | | 200 | | | |
| Example 28 | | | | 100 | | | |
| Example 29 | | 1.6 | | | | | |
| Example 30 | | 2.0 | | | | | |
| Example 31 | | 2.2 | | | | | |
| Example 32 | | 2.7 | | | | | |
| Example 33 | | 5.4 | | | | | |
| Example 34 | SBA-1 | 10.9 | | | | | |
| Example 35 | | 16.3 | | | | | |
| Example 36 | | 21.8 | | | | | |
| Example 37 | MCM-41 | 1.1 | No | 1000 | | | |
| Example 38 | | | | 500 | | | |
| Example 39 | | | | 200 | | | |
| Example 40 | | | | 100 | | | |
| Example 41 | | 1.6 | | | | | |
| Example 42 | | 2.0 | | | | | |
| Example 43 | | 2.2 | | | | | |
| Example 44 | | 2.7 | | | | | |
| Example 45 | | 5.4 | | | | | |
| Example 46 | SBA-1 | 10.9 | | | | | |
| Example 47 | | 16.3 | | | | | |
| Example 48 | | 21.8 | | | | | |

| | Structured Catalyst | | | | | | |
|---|---|---|---|---|---|---|---|
| | Support Zeolite-Type Compound | | Catalytic Substance Metal Nanoparticles | | | | |
| | | Average Inner Diameter of Channels | | Mean Particle | | Performance Evaluation | |
| No. | Framework | $D_F$ (nm) | Type | Size $D_C$ (nm) | $D_C/D_F$ | Catalytic Activity | Durability |
| Example 1 | FAU | 0.74 | Ru | 0.11 | 0.1 | C | C |
| Example 2 | | | | 0.32 | 0.4 | C | C |
| Example 3 | | | | 0.53 | 0.7 | B | C |
| Example 4 | | | | 1.06 | 1.4 | A | B |
| Example 5 | | | | 1.59 | 2.1 | A | B |
| Example 6 | | | | 1.90 | 2.6 | A | A |
| Example 7 | | | | 2.11 | 2.9 | A | A |
| Example 8 | | | | 2.64 | 3.6 | A | A |
| Example 9 | | | | 5.29 | 7.1 | B | A |
| Example 10 | | | | 10.57 | 14.3 | B | A |
| Example 11 | | | | 15.86 | 21.4 | C | A |
| Example 12 | | | | 21.14 | 28.6 | C | A |
| Example 13 | | | | 0.11 | 0.1 | C | C |
| Example 14 | | | | 0.32 | 0.4 | C | C |
| Example 15 | | | | 0.53 | 0.7 | B | C |
| Example 16 | | | | 1.06 | 1.4 | A | B |
| Example 17 | | | | 1.59 | 2.1 | A | B |
| Example 18 | | | | 1.90 | 2.6 | B | A |
| Example 19 | | | | 2.11 | 2.9 | B | A |
| Example 20 | | | | 2.64 | 3.6 | B | A |
| Example 21 | | | | 5.29 | 7.1 | C | A |
| Example 22 | | | | 10.57 | 14.3 | C | A |
| Example 23 | | | | 15.86 | 21.4 | C | A |
| Example 24 | | | | 21.14 | 28.6 | C | A |
| Example 25 | MTW | 0.61 | | 0.09 | 0.1 | C | C |
| Example 26 | | | | 0.26 | 0.4 | C | C |
| Example 27 | | | | 0.44 | 0.7 | B | C |
| Example 28 | | | | 0.87 | 1.4 | A | B |
| Example 29 | | | | 1.31 | 2.1 | A | B |
| Example 30 | | | | 1.57 | 2.6 | A | B |
| Example 31 | | | | 1.74 | 2.9 | A | A |
| Example 32 | | | | 2.18 | 3.6 | A | A |
| Example 33 | | | | 4.36 | 7.1 | B | A |

TABLE 1-continued

| | | | | | |
|---|---|---|---|---|---|
| Example 34 | | 8.71 | 14.3 | B | A |
| Example 35 | | 13.07 | 21.4 | C | A |
| Example 36 | | 17.43 | 28.6 | C | A |
| Example 37 | | 0.09 | 0.1 | C | C |
| Example 38 | | 0.26 | 0.4 | C | C |
| Example 39 | | 0.44 | 0.7 | B | C |
| Example 40 | | 0.87 | 1.4 | A | B |
| Example 41 | | 1.31 | 2.1 | A | B |
| Example 42 | | 1.57 | 2.6 | A | B |
| Example 43 | | 1.74 | 2.9 | B | A |
| Example 44 | | 2.18 | 3.6 | B | A |
| Example 45 | | 4.36 | 7.1 | C | A |
| Example 46 | | 8.71 | 14.3 | C | A |
| Example 47 | | 13.07 | 21.4 | C | A |
| Example 48 | | 17.43 | 28.6 | C | A |

TABLE 2

Manufacturing Conditions of Structured Catalyst

| No. | Precursor Material (A) Type | Precursor Material (A) Pore Diameter (nm) | Addition to Precursor Material (A) Presence or Absence of Additives | Conversion Ratio of Added Amount of Metal Containing Solution (Ratio of Number of Atoms) Si/M | Conditions of Hydrothermal Treatment using Precursor Material (C) Type of Structure Directing Agent | pH | Time (h) |
|---|---|---|---|---|---|---|---|
| Example 49 | MCM-41 | 1.0 | Yes | 1000 | TPABr | 12 | 72 |
| Example 50 | | | | 500 | | | |
| Example 51 | | | | 200 | | | |
| Example 52 | | | | 100 | | | |
| Example 53 | | 1.5 | | | | | |
| Example 54 | | 1.8 | | | | | |
| Example 55 | | 2.0 | | | | | |
| Example 56 | | 2.5 | | | | | |
| Example 57 | | 5.0 | | | | | |
| Example 58 | SBA-1 | 10.0 | | | | | |
| Example 59 | | 15.0 | | | | | |
| Example 60 | | 20.0 | | | | | |
| Example 61 | MCM-41 | 1.0 | No | 1000 | | | |
| Example 62 | | | | 500 | | | |
| Example 63 | | | | 200 | | | |
| Example 64 | | | | 100 | | | |
| Example 65 | | 1.5 | | | | | |
| Example 66 | | 1.8 | | | | | |
| Example 67 | | 2.0 | | | | | |
| Example 68 | | 2.5 | | | | | |
| Example 69 | | 5.0 | | | | | |
| Example 70 | SBA-1 | 10.0 | | | | | |
| Example 71 | | 15.0 | | | | | |
| Example 72 | | 20.0 | | | | | |
| Example 73 | MCM-41 | 1.0 | Yes | 1000 | TMABr | 12 | 120 |
| Example 74 | | | | 500 | | | |
| Example 75 | | | | 200 | | | |
| Example 76 | | | | 100 | | | |
| Example 77 | | 1.5 | | | | | |
| Example 78 | | 1.8 | | | | | |
| Example 79 | | 2.0 | | | | | |
| Example 80 | | 2.5 | | | | | |
| Example 81 | | 5.1 | | | | | |
| Example 82 | SBA-1 | 10.2 | | | | | |
| Example 83 | | 15.3 | | | | | |
| Example 84 | | 20.4 | | | | | |
| Example 85 | MCM-41 | 1.0 | No | 1000 | | | |
| Example 86 | | | | 500 | | | |
| Example 87 | | | | 200 | | | |
| Example 88 | | | | 100 | | | |

TABLE 2-continued

| | | |
|---|---|---|
| Example 89 | | 1.5 |
| Example 90 | | 1.8 |
| Example 91 | | 2.0 |
| Example 92 | | 2.5 |
| Example 93 | | 5.1 |
| Example 94 | SBA-1 | 10.2 |
| Example 95 | | 15.3 |
| Example 96 | | 20.4 |

| | Structured Catalyst | | | | | |
|---|---|---|---|---|---|---|
| | Support Zeolite-Type Compound | | Catalytic Substance Metal Nanoparticles | | Performance Evaluation | |
| | | Average Inner Diameter of Channels $D_F$ | | Mean Particle Size $D_C$ | | |
| No. | Framework | (nm) | Type | (nm) | $D_C/D_F$ | Catalytic Activity | Durability |
| Example 49 | MFI | 0.56 | Ru | 0.08 | 0.1 | C | C |
| Example 50 | | | | 0.24 | 0.4 | C | C |
| Example 51 | | | | 0.40 | 0.7 | B | C |
| Example 52 | | | | 0.80 | 1.4 | A | B |
| Example 53 | | | | 1.20 | 2.1 | A | B |
| Example 54 | | | | 1.44 | 2.6 | A | A |
| Example 55 | | | | 1.60 | 2.9 | A | A |
| Example 56 | | | | 2.00 | 3.6 | A | A |
| Example 57 | | | | 4.00 | 7.1 | B | A |
| Example 58 | | | | 8.00 | 14.3 | B | A |
| Example 59 | | | | 12.00 | 21.4 | C | A |
| Example 60 | | | | 16.00 | 28.6 | C | A |
| Example 61 | | | | 0.08 | 0.1 | C | C |
| Example 62 | | | | 0.24 | 0.4 | C | C |
| Example 63 | | | | 0.40 | 0.7 | B | C |
| Example 64 | | | | 0.80 | 1.4 | A | B |
| Example 65 | | | | 1.20 | 2.1 | A | B |
| Example 66 | | | | 1.44 | 2.6 | B | A |
| Example 67 | | | | 1.60 | 2.9 | B | A |
| Example 68 | | | | 2.00 | 3.6 | B | A |
| Example 69 | | | | 4.00 | 7.1 | C | A |
| Example 70 | | | | 8.00 | 14.3 | C | A |
| Example 71 | | | | 12.00 | 21.4 | C | A |
| Example 72 | | | | 16.00 | 28.6 | C | A |
| Example 73 | FER | 0.57 | | 0.08 | 0.1 | C | C |
| Example 74 | | | | 0.24 | 0.4 | C | C |
| Example 75 | | | | 0.41 | 0.7 | B | C |
| Example 76 | | | | 0.81 | 1.4 | A | B |
| Example 77 | | | | 1.22 | 2.1 | A | B |
| Example 78 | | | | 1.47 | 2.6 | A | B |
| Example 79 | | | | 1.63 | 2.9 | A | A |
| Example 80 | | | | 2.04 | 3.6 | A | A |
| Example 81 | | | | 4.07 | 7.1 | B | A |
| Example 82 | | | | 8.14 | 14.3 | B | A |
| Example 83 | | | | 12.21 | 21.4 | C | A |
| Example 84 | | | | 16.29 | 28.6 | C | A |
| Example 85 | | | | 0.08 | 0.1 | C | C |
| Example 86 | | | | 0.24 | 0.4 | C | C |
| Example 87 | | | | 0.41 | 0.7 | B | C |
| Example 88 | | | | 0.81 | 1.4 | A | B |
| Example 89 | | | | 1.22 | 2.1 | A | B |
| Example 90 | | | | 1.47 | 2.6 | A | B |
| Example 91 | | | | 1.63 | 2.9 | B | A |
| Example 92 | | | | 2.04 | 3.6 | B | A |
| Example 93 | | | | 4.07 | 7.1 | C | A |
| Example 94 | | | | 8.14 | 14.3 | C | A |
| Example 95 | | | | 12.21 | 21.4 | C | A |
| Example 96 | | | | 16.29 | 28.6 | C | A |

TABLE 3

| | Manufacturing Conditions of Structured Catalyst | | | | | | |
|---|---|---|---|---|---|---|---|
| | Precursor Material (A) | | Addition to Precursor Material (A) | | Conditions of Hydrothermal Treatment using Precursor Material (C) | | |
| No. | Type | Pore Diameter (nm) | Presence or Absence of Additives | Conversion Ratio of Added Amount of Metal Containing Solution (Ratio of Number of Atoms) Si/M | Type of Structure Directing Agent | pH | Time (h) |
| Example 97 | MCM-41 | 1.3 | Yes | 1000 | TEABr | 12 | 120 |
| Example 98 | | | | 500 | | | |
| Example 99 | | | | 200 | | | |
| Example 100 | | | | 100 | | | |
| Example 101 | | 2.0 | | | | | |
| Example 102 | | 2.4 | | | | | |
| Example 103 | | 2.6 | | | | | |
| Example 104 | | 3.3 | | | | | |
| Example 105 | | 6.6 | | | | | |
| Example 106 | SBA-1 | 13.2 | | | | | |
| Example 107 | | 19.8 | | | | | |
| Example 108 | | 26.4 | | | | | |
| Example 109 | MCM-41 | 1.3 | No | 1000 | | | |
| Example 110 | | | | 500 | | | |
| Example 111 | | | | 200 | | | |
| Example 112 | | | | 100 | | | |
| Example 113 | | 2.0 | | | | | |
| Example 114 | | 2.4 | | | | | |
| Example 115 | | 2.6 | | | | | |
| Example 116 | | 3.3 | | | | | |
| Example 117 | | 6.6 | | | | | |
| Example 118 | SBA-1 | 13.2 | | | | | |
| Example 119 | | 19.8 | | | | | |
| Example 120 | | 26.4 | | | | | |
| Example 121 | MCM-41 | 1.1 | Yes | 1000 | | 11 | 72 |
| Example 122 | | | | 500 | | | |
| Example 123 | | | | 200 | | | |
| Example 124 | | | | 100 | | | |
| Example 125 | | 1.6 | | | | | |
| Example 126 | | 2.0 | | | | | |
| Example 127 | | 2.2 | | | | | |
| Example 128 | | 2.7 | | | | | |
| Example 129 | | 5.4 | | | | | |
| Example 130 | SBA-1 | 10.9 | | | | | |
| Example 131 | | 16.3 | | | | | |
| Example 132 | | 21.8 | | | | | |
| Example 133 | MCM-41 | 1.1 | No | 1000 | | | |
| Example 134 | | | | 500 | | | |
| Example 135 | | | | 200 | | | |
| Example 136 | | | | 100 | | | |
| Example 137 | | 1.6 | | | | | |
| Example 138 | | 2.0 | | | | | |
| Example 139 | | 2.2 | | | | | |
| Example 140 | | 2.7 | | | | | |
| Example 141 | | 5.4 | | | | | |
| Example 142 | SBA-1 | 10.9 | | | | | |
| Example 143 | | 16.3 | | | | | |
| Example 144 | | 21.8 | | | | | |

TABLE 3-continued

| | Structured Catalyst | | | | | | |
|---|---|---|---|---|---|---|---|
| | | Support Zeolite-Type Compound | Catalytic Substance Metal Nanoparticles | | | | |
| | | Average Inner Diameter of Channels | | Mean Particle Size | | Performance Evaluation | |
| No. | Framework | $D_F$ (nm) | Type | $D_C$ (nm) | $D_C/D_F$ | Catalytic Activity | Durability |
| Example 97 | FAU | 0.74 | Ni | 0.11 | 0.1 | C | C |
| Example 98 | | | | 0.32 | 0.4 | C | C |
| Example 99 | | | | 0.53 | 0.7 | B | C |
| Example 100 | | | | 1.06 | 1.4 | A | B |
| Example 101 | | | | 1.59 | 2.1 | A | B |
| Example 102 | | | | 1.90 | 2.6 | A | A |
| Example 103 | | | | 2.11 | 2.9 | A | A |
| Example 104 | | | | 2.64 | 3.6 | A | A |
| Example 105 | | | | 5.29 | 7.1 | B | A |
| Example 106 | | | | 10.57 | 14.3 | B | A |
| Example 107 | | | | 15.86 | 21.4 | C | A |
| Example 108 | | | | 21.14 | 28.6 | C | A |
| Example 109 | | | | 0.11 | 0.1 | C | C |
| Example 110 | | | | 0.32 | 0.4 | C | C |
| Example 111 | | | | 0.53 | 0.7 | B | C |
| Example 112 | | | | 1.06 | 1.4 | A | B |
| Example 113 | | | | 1.59 | 2.1 | A | B |
| Example 114 | | | | 1.90 | 2.6 | B | A |
| Example 115 | | | | 2.11 | 2.9 | B | A |
| Example 116 | | | | 2.64 | 3.6 | B | A |
| Example 117 | | | | 5.29 | 7.1 | C | A |
| Example 118 | | | | 10.57 | 14.3 | C | A |
| Example 119 | | | | 15.86 | 21.4 | C | A |
| Example 120 | | | | 21.14 | 28.6 | C | A |
| Example 121 | MTW | 0.61 | | 0.09 | 0.1 | C | C |
| Example 122 | | | | 0.26 | 0.4 | C | C |
| Example 123 | | | | 0.44 | 0.7 | B | C |
| Example 124 | | | | 0.87 | 1.4 | A | B |
| Example 125 | | | | 1.31 | 2.1 | A | B |
| Example 126 | | | | 1.57 | 2.6 | A | B |
| Example 127 | | | | 1.74 | 2.9 | A | A |
| Example 128 | | | | 2.18 | 3.6 | A | A |
| Example 129 | | | | 4.36 | 7.1 | B | A |
| Example 130 | | | | 8.71 | 14.3 | B | A |
| Example 131 | | | | 13.07 | 21.4 | C | A |
| Example 132 | | | | 17.43 | 28.6 | C | A |
| Example 133 | | | | 0.09 | 0.1 | C | C |
| Example 134 | | | | 0.26 | 0.4 | C | C |
| Example 135 | | | | 0.44 | 0.7 | B | C |
| Example 136 | | | | 0.87 | 1.4 | A | B |
| Example 137 | | | | 1.31 | 2.1 | A | B |
| Example 138 | | | | 1.57 | 2.6 | A | B |
| Example 139 | | | | 1.74 | 2.9 | B | A |
| Example 140 | | | | 2.18 | 3.6 | B | A |
| Example 141 | | | | 4.36 | 7.1 | C | A |
| Example 142 | | | | 8.71 | 14.3 | C | A |
| Example 143 | | | | 13.07 | 21.4 | C | A |
| Example 144 | | | | 17.43 | 28.6 | C | A |

TABLE 4

| | Manufacturing Conditions of Structured Catalyst | | | | | | |
|---|---|---|---|---|---|---|---|
| | | | Addition to Precursor Material (A) | | | | |
| | Precursor Material (A) | | | Conversion Ratio of Added Amount of Metal Containing Solution (Ratio of Number of Atoms) Si/M | Conditions of Hydrothermal Treatment using Precursor Material (C) | | |
| No. | Type | Pore Diameter (nm) | Presence or Absence of Additives | | Type of Structure Directing Agent | pH | Time (h) |
| Example 145 | MCM-41 | 1.0 | Yes | 1000 | TPABr | 12 | 72 |
| Example 146 | | | | 500 | | | |
| Example 147 | | | | 200 | | | |
| Example 148 | | | | 100 | | | |
| Example 149 | | 1.5 | | | | | |
| Example 150 | | 1.8 | | | | | |
| Example 151 | | 2.0 | | | | | |
| Example 152 | | 2.5 | | | | | |
| Example 153 | | 5.0 | | | | | |
| Example 154 | SBA-1 | 10.0 | | | | | |
| Example 155 | | 15.0 | | | | | |
| Example 156 | | 20.0 | | | | | |
| Example 157 | MCM-41 | 1.0 | No | 1000 | | | |
| Example 158 | | | | 500 | | | |
| Example 159 | | | | 200 | | | |
| Example 160 | | | | 100 | | | |
| Example 161 | | 1.5 | | | | | |
| Example 162 | | 1.8 | | | | | |
| Example 163 | | 2.0 | | | | | |
| Example 164 | | 2.5 | | | | | |
| Example 165 | | 5.0 | | | | | |
| Example 166 | SBA-1 | 10.0 | | | | | |
| Example 167 | | 15.0 | | | | | |
| Example 168 | | 20.0 | | | | | |
| Example 169 | MCM-41 | 1.0 | Yes | 1000 | TMABr | 12 | 120 |
| Example 170 | | | | 500 | | | |
| Example 171 | | | | 200 | | | |
| Example 172 | | | | 100 | | | |
| Example 173 | | 1.5 | | | | | |
| Example 174 | | 1.8 | | | | | |
| Example 175 | | 2.0 | | | | | |
| Example 176 | | 2.5 | | | | | |
| Example 177 | | 5.1 | | | | | |
| Example 178 | SBA-1 | 10.2 | | | | | |
| Example 179 | | 15.3 | | | | | |
| Example 180 | | 20.4 | | | | | |
| Example 181 | MCM-41 | 1.0 | No | 1000 | | | |
| Example 182 | | | | 500 | | | |
| Example 183 | | | | 200 | | | |
| Example 184 | | | | 100 | | | |
| Example 185 | | 1.5 | | | | | |
| Example 186 | | 1.8 | | | | | |
| Example 187 | | 2.0 | | | | | |
| Example 188 | | 2.5 | | | | | |
| Example 189 | | 5.1 | | | | | |
| Example 190 | SBA-1 | 10.2 | | | | | |
| Example 191 | | 15.3 | | | | | |
| Example 192 | | 20.4 | | | | | |

TABLE 4-continued

| | | Structured Catalyst | | | | | |
|---|---|---|---|---|---|---|---|
| | | Support Zeolite-Type Compound | | Catalytic Substance | | | |
| | | Average Inner Diameter of Channels | | Metal Nanoparticles | | Performance Evaluation | |
| No. | Framework | $D_F$ (nm) | Type | Mean Particle Size $D_C$ (nm) | $D_C/D_F$ | Catalytic Activity | Durability |
| Example 145 | MFI | 0.56 | Ni | 0.08 | 0.1 | C | C |
| Example 146 | | | | 0.24 | 0.4 | C | C |
| Example 147 | | | | 0.40 | 0.7 | B | C |
| Example 148 | | | | 0.80 | 1.4 | A | B |
| Example 149 | | | | 1.20 | 2.1 | A | B |
| Example 150 | | | | 1.44 | 2.6 | A | A |
| Example 151 | | | | 1.60 | 2.9 | A | A |
| Example 152 | | | | 2.00 | 3.6 | A | A |
| Example 153 | | | | 4.00 | 7.1 | B | A |
| Example 154 | | | | 8.00 | 14.3 | B | A |
| Example 155 | | | | 12.00 | 21.4 | C | A |
| Example 156 | | | | 16.00 | 28.6 | C | A |
| Example 157 | | | | 0.08 | 0.1 | C | C |
| Example 158 | | | | 0.24 | 0.4 | C | C |
| Example 159 | | | | 0.40 | 0.7 | B | C |
| Example 160 | | | | 0.80 | 1.4 | A | B |
| Example 161 | | | | 1.20 | 2.1 | A | B |
| Example 162 | | | | 1.44 | 2.6 | B | A |
| Example 163 | | | | 1.60 | 2.9 | B | A |
| Example 164 | | | | 2.00 | 3.6 | B | A |
| Example 165 | | | | 4.00 | 7.1 | C | A |
| Example 166 | | | | 8.00 | 14.3 | C | A |
| Example 167 | | | | 12.00 | 21.4 | C | A |
| Example 168 | | | | 16.00 | 28.6 | C | A |
| Example 169 | FER | 0.57 | | 0.08 | 0.1 | C | C |
| Example 170 | | | | 0.24 | 0.4 | C | C |
| Example 171 | | | | 0.41 | 0.7 | B | C |
| Example 172 | | | | 0.81 | 1.4 | A | B |
| Example 173 | | | | 1.22 | 2.1 | A | B |
| Example 174 | | | | 1.47 | 2.6 | A | B |
| Example 175 | | | | 1.63 | 2.9 | A | A |
| Example 176 | | | | 2.04 | 3.6 | A | A |
| Example 177 | | | | 4.07 | 7.1 | B | A |
| Example 178 | | | | 8.14 | 14.3 | B | A |
| Example 179 | | | | 12.21 | 21.4 | C | A |
| Example 180 | | | | 16.29 | 28.6 | C | A |
| Example 181 | | | | 0.08 | 0.1 | C | C |
| Example 182 | | | | 0.24 | 0.4 | C | C |
| Example 183 | | | | 0.41 | 0.7 | B | C |
| Example 184 | | | | 0.81 | 1.4 | A | B |
| Example 185 | | | | 1.22 | 2.1 | A | B |
| Example 186 | | | | 1.47 | 2.6 | A | B |
| Example 187 | | | | 1.63 | 2.9 | B | A |
| Example 188 | | | | 2.04 | 3.6 | B | A |
| Example 189 | | | | 4.07 | 7.1 | C | A |
| Example 190 | | | | 8.14 | 14.3 | C | A |
| Example 191 | | | | 12.21 | 21.4 | C | A |
| Example 192 | | | | 16.29 | 28.6 | C | A |

TABLE 5

| | Manufacturing Conditions of Structured Catalyst | | | | | | |
|---|---|---|---|---|---|---|---|
| | Precursor Material (A) | | Addition to Precursor Material (A) | | Conditions of Hydrothermal Treatment using Precursor Material (C) | | |
| | | | Presence or Absence of Additives | Conversion Ratio of Added Amount of Metal Containing Solution (Ratio of Number of Atoms) Si/M | Type of Structure Directing Agent | pH | Time (h) |
| No. | Type | Pore Diameter (nm) | | | | | |
| Example 193 | MCM-41 | 1.3 | Yes | 1000 | TEABr | 12 | 120 |
| Example 194 | | | | 500 | | | |
| Example 195 | | | | 200 | | | |
| Example 196 | | | | 100 | | | |
| Example 197 | | 2.0 | | | | | |
| Example 198 | | 2.4 | | | | | |
| Example 199 | | 2.6 | | | | | |
| Example 200 | | 3.3 | | | | | |
| Example 201 | | 6.6 | | | | | |
| Example 202 | SBA-1 | 13.2 | | | | | |
| Example 203 | | 19.8 | | | | | |
| Example 204 | | 26.4 | | | | | |
| Example 205 | MCM-41 | 1.3 | No | 1000 | | | |
| Example 206 | | | | 500 | | | |
| Example 207 | | | | 200 | | | |
| Example 208 | | | | 100 | | | |
| Example 209 | | 2.0 | | | | | |
| Example 210 | | 2.4 | | | | | |
| Example 211 | | 2.6 | | | | | |
| Example 212 | | 3.3 | | | | | |
| Example 213 | | 6.6 | | | | | |
| Example 214 | SBA-1 | 13.2 | | | | | |
| Example 215 | | 19.8 | | | | | |
| Example 216 | | 26.4 | | | | | |
| Example 217 | MCM-41 | 1.1 | Yes | 1000 | | 11 | 72 |
| Example 218 | | | | 500 | | | |
| Example 219 | | | | 200 | | | |
| Example 220 | | | | 100 | | | |
| Example 221 | | 1.6 | | | | | |
| Example 222 | | 2.0 | | | | | |
| Example 223 | | 2.2 | | | | | |
| Example 224 | | 2.7 | | | | | |
| Example 225 | | 5.4 | | | | | |
| Example 226 | SBA-1 | 10.9 | | | | | |
| Example 227 | | 16.3 | | | | | |
| Example 228 | | 21.8 | | | | | |
| Example 229 | MCM-41 | 1.1 | No | 1000 | | | |
| Example 230 | | | | 500 | | | |
| Example 231 | | | | 200 | | | |
| Example 232 | | | | 100 | | | |
| Example 233 | | 1.6 | | | | | |
| Example 234 | | 2.0 | | | | | |
| Example 235 | | 2.2 | | | | | |
| Example 236 | | 2.7 | | | | | |
| Example 237 | | 5.4 | | | | | |
| Example 238 | SBA-1 | 10.9 | | | | | |
| Example 239 | | 16.3 | | | | | |
| Example 240 | | 21.8 | | | | | |

TABLE 5-continued

| | Structured Catalyst | | | | | |
| | Support Zeolite-Type Compound | | Catalytic Substance | | | |
| | | Average Inner Diameter of Channels | Metal Nanoparticles | Mean Particle Size $D_C$ | Performance Evaluation | |
| No. | Framework | $D_F$ (nm) | Type | (nm) | $D_C/D_F$ | Catalytic Activity | Durability |
| --- | --- | --- | --- | --- | --- | --- | --- |
| Example 193 | FAU | 0.74 | Ir | 0.11 | 0.1 | C | C |
| Example 194 | | | | 0.32 | 0.4 | C | C |
| Example 195 | | | | 0.53 | 0.7 | B | C |
| Example 196 | | | | 1.06 | 1.4 | A | B |
| Example 197 | | | | 1.59 | 2.1 | A | B |
| Example 198 | | | | 1.90 | 2.6 | A | A |
| Example 199 | | | | 2.11 | 2.9 | A | A |
| Example 200 | | | | 2.64 | 3.6 | A | A |
| Example 201 | | | | 5.29 | 7.1 | B | A |
| Example 202 | | | | 10.57 | 14.3 | B | A |
| Example 203 | | | | 15.86 | 21.4 | C | A |
| Example 204 | | | | 21.14 | 28.6 | C | A |
| Example 205 | | | | 0.11 | 0.1 | C | C |
| Example 206 | | | | 0.32 | 0.4 | C | C |
| Example 207 | | | | 0.53 | 0.7 | B | C |
| Example 208 | | | | 1.06 | 1.4 | A | B |
| Example 209 | | | | 1.59 | 2.1 | A | B |
| Example 210 | | | | 1.90 | 2.6 | B | A |
| Example 211 | | | | 2.11 | 2.9 | B | A |
| Example 212 | | | | 2.64 | 3.6 | B | A |
| Example 213 | | | | 5.29 | 7.1 | C | A |
| Example 214 | | | | 10.57 | 14.3 | C | A |
| Example 215 | | | | 15.86 | 21.4 | C | A |
| Example 216 | | | | 21.14 | 28.6 | C | A |
| Example 217 | MTW | 0.61 | | 0.09 | 0.1 | C | C |
| Example 218 | | | | 0.26 | 0.4 | C | C |
| Example 219 | | | | 0.44 | 0.7 | B | C |
| Example 220 | | | | 0.87 | 1.4 | A | B |
| Example 221 | | | | 1.31 | 2.1 | A | B |
| Example 222 | | | | 1.57 | 2.6 | A | B |
| Example 223 | | | | 1.74 | 2.9 | A | A |
| Example 224 | | | | 2.18 | 3.6 | A | A |
| Example 225 | | | | 4.36 | 7.1 | B | A |
| Example 226 | | | | 8.71 | 14.3 | B | A |
| Example 227 | | | | 13.07 | 21.4 | C | A |
| Example 228 | | | | 17.43 | 28.6 | C | A |
| Example 229 | | | | 0.09 | 0.1 | C | C |
| Example 230 | | | | 0.26 | 0.4 | C | C |
| Example 231 | | | | 0.44 | 0.7 | B | C |
| Example 232 | | | | 0.87 | 1.4 | A | B |
| Example 233 | | | | 1.31 | 2.1 | A | B |
| Example 234 | | | | 1.57 | 2.6 | A | B |
| Example 235 | | | | 1.74 | 2.9 | B | A |
| Example 236 | | | | 2.18 | 3.6 | B | A |
| Example 237 | | | | 4.36 | 7.1 | C | A |
| Example 238 | | | | 8.71 | 14.3 | C | A |
| Example 239 | | | | 13.07 | 21.4 | C | A |
| Example 240 | | | | 17.43 | 28.6 | C | A |

TABLE 6

| | Manufacturing Conditions of Structured Catalyst | | | | | | |
|---|---|---|---|---|---|---|---|
| | Precursor Material (A) | | Addition to Precursor Material (A) | | Conditions of Hydrothermal Treatment using Precursor Material (C) | | |
| | | | Presence or Absence of Additives | Conversion Ratio of Added Amount of Metal Containing Solution (Ratio of Number of Atoms) Si/M | Type of Structure Directing Agent | | |
| No. | Type | Pore Diameter (nm) | | | | pH | Time (h) |
| Example 241 | MCM-41 | 1.0 | Yes | 1000 | TPABr | 12 | 72 |
| Example 242 | | | | 500 | | | |
| Example 243 | | | | 200 | | | |
| Example 244 | | | | 100 | | | |
| Example 245 | | 1.5 | | | | | |
| Example 246 | | 1.8 | | | | | |
| Example 247 | | 2.0 | | | | | |
| Example 248 | | 2.5 | | | | | |
| Example 249 | | 5.0 | | | | | |
| Example 250 | SBA-1 | 10.0 | | | | | |
| Example 251 | | 15.0 | | | | | |
| Example 252 | | 20.0 | | | | | |
| Example 253 | MCM-41 | 1.0 | No | 1000 | | | |
| Example 254 | | | | 500 | | | |
| Example 255 | | | | 200 | | | |
| Example 256 | | | | 100 | | | |
| Example 257 | | 1.5 | | | | | |
| Example 258 | | 1.8 | | | | | |
| Example 259 | | 2.0 | | | | | |
| Example 260 | | 2.5 | | | | | |
| Example 261 | | 5.0 | | | | | |
| Example 262 | SBA-1 | 10.0 | | | | | |
| Example 263 | | 15.0 | | | | | |
| Example 264 | | 20.0 | | | | | |
| Example 265 | MCM-41 | 1.0 | Yes | 1000 | TMABr | 12 | 120 |
| Example 266 | | | | 500 | | | |
| Example 267 | | | | 200 | | | |
| Example 268 | | | | 100 | | | |
| Example 269 | | 1.5 | | | | | |
| Example 270 | | 1.8 | | | | | |
| Example 271 | | 2.0 | | | | | |
| Example 272 | | 2.5 | | | | | |
| Example 273 | | 5.1 | | | | | |
| Example 274 | SBA-1 | 10.2 | | | | | |
| Example 275 | | 15.3 | | | | | |
| Example 276 | | 20.4 | | | | | |
| Example 277 | MCM-41 | 1.0 | No | 1000 | | | |
| Example 278 | | | | 500 | | | |
| Example 279 | | | | 200 | | | |
| Example 280 | | | | 100 | | | |
| Example 281 | | 1.5 | | | | | |
| Example 282 | | 1.8 | | | | | |
| Example 283 | | 2.0 | | | | | |
| Example 284 | | 2.5 | | | | | |
| Example 285 | | 5.1 | | | | | |
| Example 286 | SBA-1 | 10.2 | | | | | |
| Example 287 | | 15.3 | | | | | |
| Example 288 | | 20.4 | | | | | |

TABLE 6-continued

| | | Structured Catalyst | | | | | |
| | | Support Zeolite-Type Compound | | Catalytic Substance | | | |
| | | Average Inner | | Metal Nanoparticles | | | |
| | | Diameter of Channels | | Mean Particle | | Performance Evaluation | |
| No. | Framework | $D_F$ (nm) | Type | Size $D_C$ (nm) | $D_C/D_F$ | Catalytic Activity | Durability |
| --- | --- | --- | --- | --- | --- | --- | --- |
| Example 241 | MFI | 0.56 | Ir | 0.08 | 0.1 | C | C |
| Example 242 | | | | 0.24 | 0.4 | C | C |
| Example 243 | | | | 0.40 | 0.7 | B | C |
| Example 244 | | | | 0.80 | 1.4 | A | B |
| Example 245 | | | | 1.20 | 2.1 | A | B |
| Example 246 | | | | 1.44 | 2.6 | A | A |
| Example 247 | | | | 1.60 | 2.9 | A | A |
| Example 248 | | | | 2.00 | 3.6 | A | A |
| Example 249 | | | | 4.00 | 7.1 | B | A |
| Example 250 | | | | 8.00 | 14.3 | B | A |
| Example 251 | | | | 12.00 | 21.4 | C | A |
| Example 252 | | | | 16.00 | 28.6 | C | A |
| Example 253 | | | | 0.08 | 0.1 | C | C |
| Example 254 | | | | 0.24 | 0.4 | C | C |
| Example 255 | | | | 0.40 | 0.7 | B | C |
| Example 256 | | | | 0.80 | 1.4 | A | B |
| Example 257 | | | | 1.20 | 2.1 | A | B |
| Example 258 | | | | 1.44 | 2.6 | B | A |
| Example 259 | | | | 1.60 | 2.9 | B | A |
| Example 260 | | | | 2.00 | 3.6 | B | A |
| Example 261 | | | | 4.00 | 7.1 | C | A |
| Example 262 | | | | 8.00 | 14.3 | C | A |
| Example 263 | | | | 12.00 | 21.4 | C | A |
| Example 264 | | | | 16.00 | 28.6 | C | A |
| Example 265 | FER | 0.57 | | 0.08 | 0.1 | C | C |
| Example 266 | | | | 0.24 | 0.4 | C | C |
| Example 267 | | | | 0.41 | 0.7 | B | C |
| Example 268 | | | | 0.81 | 1.4 | A | B |
| Example 269 | | | | 1.22 | 2.1 | A | B |
| Example 270 | | | | 1.47 | 2.6 | A | B |
| Example 271 | | | | 1.63 | 2.9 | A | A |
| Example 272 | | | | 2.04 | 3.6 | A | A |
| Example 273 | | | | 4.07 | 7.1 | B | A |
| Example 274 | | | | 8.14 | 14.3 | B | A |
| Example 275 | | | | 12.21 | 21.4 | C | A |
| Example 276 | | | | 16.29 | 28.6 | C | A |
| Example 277 | | | | 0.08 | 0.1 | C | C |
| Example 278 | | | | 0.24 | 0.4 | C | C |
| Example 279 | | | | 0.41 | 0.7 | B | C |
| Example 280 | | | | 0.81 | 1.4 | A | B |
| Example 281 | | | | 1.22 | 2.1 | A | B |
| Example 282 | | | | 1.47 | 2.6 | A | B |
| Example 283 | | | | 1.63 | 2.9 | B | A |
| Example 284 | | | | 2.04 | 3.6 | B | A |
| Example 285 | | | | 4.07 | 7.1 | C | A |
| Example 286 | | | | 8.14 | 14.3 | C | A |
| Example 287 | | | | 12.21 | 21.4 | C | A |
| Example 288 | | | | 16.29 | 28.6 | C | A |

TABLE 7

| | Manufacturing Conditions of Structured Catalyst | | | | | | |
|---|---|---|---|---|---|---|---|
| | Precursor Material (A) | | Addition to Precursor Material (A) | | Conditions of Hydrothermal Treatment using Precursor Material (C) | | |
| No. | Type | Pore Diameter (nm) | Presence or Absence of Additives | Conversion Ratio of Added Amount of Metal Containing Solution (Ratio of Number of Atoms) Si/M | Type of Structure Directing Agent | pH | Time (h) |
| Example 289 | MCM-41 | 1.3 | Yes | 1000 | TEABr | 12 | 120 |
| Example 290 | | | | 500 | | | |
| Example 291 | | | | 200 | | | |
| Example 292 | | | | 100 | | | |
| Example 293 | | 2.0 | | | | | |
| Example 294 | | 2.4 | | | | | |
| Example 295 | | 2.6 | | | | | |
| Example 296 | | 3.3 | | | | | |
| Example 297 | | 6.6 | | | | | |
| Example 298 | SBA-1 | 13.2 | | | | | |
| Example 299 | | 19.8 | | | | | |
| Example 300 | | 26.4 | | | | | |
| Example 301 | MCM-41 | 1.3 | No | 1000 | | | |
| Example 302 | | | | 500 | | | |
| Example 303 | | | | 200 | | | |
| Example 304 | | | | 100 | | | |
| Example 305 | | 2.0 | | | | | |
| Example 306 | | 2.4 | | | | | |
| Example 307 | | 2.6 | | | | | |
| Example 308 | | 3.3 | | | | | |
| Example 309 | | 6.6 | | | | | |
| Example 310 | SBA-1 | 13.2 | | | | | |
| Example 311 | | 19.8 | | | | | |
| Example 312 | | 26.4 | | | | | |
| Example 313 | MCM-41 | 1.1 | Yes | 1000 | | 11 | 72 |
| Example 314 | | | | 500 | | | |
| Example 315 | | | | 200 | | | |
| Example 316 | | | | 100 | | | |
| Example 317 | | 1.6 | | | | | |
| Example 318 | | 2.0 | | | | | |
| Example 319 | | 2.2 | | | | | |
| Example 320 | | 2.7 | | | | | |
| Example 321 | | 5.4 | | | | | |
| Example 322 | SBA-1 | 10.9 | | | | | |
| Example 323 | | 16.3 | | | | | |
| Example 324 | | 21.8 | | | | | |
| Example 325 | MCM-41 | 1.1 | No | 1000 | | | |
| Example 326 | | | | 500 | | | |
| Example 327 | | | | 200 | | | |
| Example 328 | | | | 100 | | | |
| Example 329 | | 1.6 | | | | | |
| Example 330 | | 2.0 | | | | | |
| Example 331 | | 2.2 | | | | | |
| Example 332 | | 2.7 | | | | | |
| Example 333 | | 5.4 | | | | | |
| Example 334 | SBA-1 | 10.9 | | | | | |
| Example 335 | | 16.3 | | | | | |
| Example 336 | | 21.8 | | | | | |

TABLE 7-continued

| | Structured Catalyst | | | | | | |
|---|---|---|---|---|---|---|---|
| | | Support Zeolite-Type Compound | | Catalytic Substance Metal Nanoparticles | | | |
| | | Average Inner Diameter of Channels | | Mean Particle | | Performance Evaluation | |
| No. | Framework | $D_F$ (nm) | Type | Size $D_C$ (nm) | $D_C/D_F$ | Catalytic Activity | Durability |
| Example 289 | FAU | 0.74 | Rh | 0.11 | 0.1 | C | C |
| Example 290 | | | | 0.32 | 0.4 | C | C |
| Example 291 | | | | 0.53 | 0.7 | B | C |
| Example 292 | | | | 1.06 | 1.4 | A | B |
| Example 293 | | | | 1.59 | 2.1 | A | B |
| Example 294 | | | | 1.90 | 2.6 | A | A |
| Example 295 | | | | 2.11 | 2.9 | A | A |
| Example 296 | | | | 2.64 | 3.6 | A | A |
| Example 297 | | | | 5.29 | 7.1 | B | A |
| Example 298 | | | | 10.57 | 14.3 | B | A |
| Example 299 | | | | 15.86 | 21.4 | C | A |
| Example 300 | | | | 21.14 | 28.6 | C | A |
| Example 301 | | | | 0.11 | 0.1 | C | C |
| Example 302 | | | | 0.32 | 0.4 | C | C |
| Example 303 | | | | 0.53 | 0.7 | B | C |
| Example 304 | | | | 1.06 | 1.4 | A | B |
| Example 305 | | | | 1.59 | 2.1 | A | B |
| Example 306 | | | | 1.90 | 2.6 | B | A |
| Example 307 | | | | 2.11 | 2.9 | B | A |
| Example 308 | | | | 2.64 | 3.6 | B | A |
| Example 309 | | | | 5.29 | 7.1 | C | A |
| Example 310 | | | | 10.57 | 14.3 | C | A |
| Example 311 | | | | 15.86 | 21.4 | C | A |
| Example 312 | | | | 21.14 | 28.6 | C | A |
| Example 313 | MTW | 0.61 | | 0.09 | 0.1 | C | C |
| Example 314 | | | | 0.26 | 0.4 | C | C |
| Example 315 | | | | 0.44 | 0.7 | B | C |
| Example 316 | | | | 0.87 | 1.4 | A | B |
| Example 317 | | | | 1.31 | 2.1 | A | B |
| Example 318 | | | | 1.57 | 2.6 | A | B |
| Example 319 | | | | 1.74 | 2.9 | A | A |
| Example 320 | | | | 2.18 | 3.6 | A | A |
| Example 321 | | | | 4.36 | 7.1 | B | A |
| Example 322 | | | | 8.71 | 14.3 | B | A |
| Example 323 | | | | 13.07 | 21.4 | C | A |
| Example 324 | | | | 17.43 | 28.6 | C | A |
| Example 325 | | | | 0.09 | 0.1 | C | C |
| Example 326 | | | | 0.26 | 0.4 | C | C |
| Example 327 | | | | 0.44 | 0.7 | B | C |
| Example 328 | | | | 0.87 | 1.4 | A | B |
| Example 329 | | | | 1.31 | 2.1 | A | B |
| Example 330 | | | | 1.57 | 2.6 | A | B |
| Example 331 | | | | 1.74 | 2.9 | B | A |
| Example 332 | | | | 2.18 | 3.6 | B | A |
| Example 333 | | | | 4.36 | 7.1 | C | A |
| Example 334 | | | | 8.71 | 14.3 | C | A |
| Example 335 | | | | 13.07 | 21.4 | C | A |
| Example 336 | | | | 17.43 | 28.6 | C | A |

TABLE 8

| | Manufacturing Conditions of Structured Catalyst | | | | | | |
|---|---|---|---|---|---|---|---|
| | Precursor Material (A) | | Addition to Precursor Material (A) | | Conditions of Hydrothermal Treatment using Precursor Material (C) | | |
| No. | Type | Pore Diameter (nm) | Presence or Absence of Additives | Conversion Ratio of Added Amount of Metal Containing Solution (Ratio of Number of Atoms) Si/M | Type of Structure Directing Agent | pH | Time (h) |
| Example 337 | MCM-41 | 1.0 | Yes | 1000 | TPABr | 12 | 72 |
| Example 338 | | | | 500 | | | |
| Example 339 | | | | 200 | | | |
| Example 340 | | | | 100 | | | |
| Example 341 | | 1.5 | | | | | |
| Example 342 | | 1.8 | | | | | |
| Example 343 | | 2.0 | | | | | |
| Example 344 | | 2.5 | | | | | |
| Example 345 | | 5.0 | | | | | |
| Example 346 | SBA-1 | 10.0 | | | | | |
| Example 347 | | 15.0 | | | | | |
| Example 348 | | 20.0 | | | | | |
| Example 349 | MCM-41 | 1.0 | No | 1000 | | | |
| Example 350 | | | | 500 | | | |
| Example 351 | | | | 200 | | | |
| Example 352 | | | | 100 | | | |
| Example 353 | | 1.5 | | | | | |
| Example 354 | | 1.8 | | | | | |
| Example 355 | | 2.0 | | | | | |
| Example 356 | | 2.5 | | | | | |
| Example 357 | | 5.0 | | | | | |
| Example 358 | SBA-1 | 10.0 | | | | | |
| Example 359 | | 15.0 | | | | | |
| Example 360 | | 20.0 | | | | | |
| Example 361 | MCM-41 | 1.0 | Yes | 1000 | TMABr | 12 | 120 |
| Example 362 | | | | 500 | | | |
| Example 363 | | | | 200 | | | |
| Example 364 | | | | 100 | | | |
| Example 365 | | 1.5 | | | | | |
| Example 366 | | 1.8 | | | | | |
| Example 367 | | 2.0 | | | | | |
| Example 368 | | 2.5 | | | | | |
| Example 369 | | 5.1 | | | | | |
| Example 370 | SBA-1 | 10.2 | | | | | |
| Example 371 | | 15.3 | | | | | |
| Example 372 | | 20.4 | | | | | |
| Example 373 | MCM-41 | 1.0 | No | 1000 | | | |
| Example 374 | | | | 500 | | | |
| Example 375 | | | | 200 | | | |
| Example 376 | | | | 100 | | | |
| Example 377 | | 1.5 | | | | | |
| Example 378 | | 1.8 | | | | | |
| Example 379 | | 2.0 | | | | | |
| Example 380 | | 2.5 | | | | | |
| Example 381 | | 5.1 | | | | | |
| Example 382 | SBA-1 | 10.2 | | | | | |
| Example 383 | | 15.3 | | | | | |
| Example 384 | | 20.4 | | | | | |
| Comparative Example 1 | — | | | | | | |
| Comparative Example 2 | — | | | | | | |

TABLE 8-continued

|  |  | Structured Catalyst | | | | | |
|---|---|---|---|---|---|---|---|
|  |  | Support Zeolite-Type Compound | | Catalytic Substance Metal Nanoparticles | | | |
|  |  |  |  |  |  | Performance Evaluation | |
| No. | Framework | Average Inner Diameter of Channels $D_F$ (nm) | Type | Mean Particle Size $D_C$ (nm) | $D_C/D_F$ | Catalytic Activity | Durability |
| Example 337 | MFI | 0.56 | Rh | 0.08 | 0.1 | C | C |
| Example 338 |  |  |  | 0.24 | 0.4 | C | C |
| Example 339 |  |  |  | 0.40 | 0.7 | B | C |
| Example 340 |  |  |  | 0.80 | 1.4 | A | B |
| Example 341 |  |  |  | 1.20 | 2.1 | A | B |
| Example 342 |  |  |  | 1.44 | 2.6 | A | A |
| Example 343 |  |  |  | 1.60 | 2.9 | A | A |
| Example 344 |  |  |  | 2.00 | 3.6 | A | A |
| Example 345 |  |  |  | 4.00 | 7.1 | B | A |
| Example 346 |  |  |  | 8.00 | 14.3 | B | A |
| Example 347 |  |  |  | 12.00 | 21.4 | C | A |
| Example 348 |  |  |  | 16.00 | 28.6 | C | A |
| Example 349 |  |  |  | 0.08 | 0.1 | C | C |
| Example 350 |  |  |  | 0.24 | 0.4 | C | C |
| Example 351 |  |  |  | 0.40 | 0.7 | B | C |
| Example 352 |  |  |  | 0.80 | 1.4 | A | B |
| Example 353 |  |  |  | 1.20 | 2.1 | A | B |
| Example 354 |  |  |  | 1.44 | 2.6 | B | A |
| Example 355 |  |  |  | 1.60 | 2.9 | B | A |
| Example 356 |  |  |  | 2.00 | 3.6 | B | A |
| Example 357 |  |  |  | 4.00 | 7.1 | C | A |
| Example 358 |  |  |  | 8.00 | 14.3 | C | A |
| Example 359 |  |  |  | 12.00 | 21.4 | C | A |
| Example 360 |  |  |  | 16.00 | 28.6 | C | A |
| Example 361 | FER | 0.57 |  | 0.08 | 0.1 | C | C |
| Example 362 |  |  |  | 0.24 | 0.4 | C | C |
| Example 363 |  |  |  | 0.41 | 0.7 | B | C |
| Example 364 |  |  |  | 0.81 | 1.4 | A | B |
| Example 365 |  |  |  | 1.22 | 2.1 | A | B |
| Example 366 |  |  |  | 1.47 | 2.6 | A | B |
| Example 367 |  |  |  | 1.63 | 2.9 | A | A |
| Example 368 |  |  |  | 2.04 | 3.6 | A | A |
| Example 369 |  |  |  | 4.07 | 7.1 | B | A |
| Example 370 |  |  |  | 8.14 | 14.3 | B | A |
| Example 371 |  |  |  | 12.21 | 21.4 | C | A |
| Example 372 |  |  |  | 16.29 | 28.6 | C | A |
| Example 373 |  |  |  | 0.08 | 0.1 | C | C |
| Example 374 |  |  |  | 0.24 | 0.4 | C | C |
| Example 375 |  |  |  | 0.41 | 0.7 | B | C |
| Example 376 |  |  |  | 0.81 | 1.4 | A | B |
| Example 377 |  |  |  | 1.22 | 2.1 | A | B |
| Example 378 |  |  |  | 1.47 | 2.6 | A | B |
| Example 379 |  |  |  | 1.63 | 2.9 | B | A |
| Example 380 |  |  |  | 2.04 | 3.6 | B | A |
| Example 381 |  |  |  | 4.07 | 7.1 | C | A |
| Example 382 |  |  |  | 8.14 | 14.3 | C | A |
| Example 383 |  |  |  | 12.21 | 21.4 | C | A |
| Example 384 |  |  |  | 16.29 | 28.6 | C | A |
| Comparative Example 1 | MFI type silicalite | 0.56 | Co | ≤50 | ≤67.6 | C | D |
| Comparative Example 2 | MFI type silicalite | 0.56 | — | — | — | D | D |

As can be seen from Tables 1 to 8, the structured catalyst (Examples 1 to 384), which was confirmed by cross-sectional observation to hold the catalytic substance in the interior of the support was found to exhibit excellent catalytic activity and excellent durability as a catalyst in the steam reforming reaction using JIS1 kerosene as the reforming raw material when compared to the structured catalyst in which the catalytic substance is simply attached to the outer surface of the support (Comparative Example 1) or the support itself without any catalytic substances (Comparative Example 2).

On the other hand, the structured catalyst of Comparative Example 1 in which the catalytic substance was attached only to the outer surface of the support showed improvement in the catalytic activity in the steam reforming reaction using JIS1 kerosene as the reforming raw material when compared to the support itself without any catalytic substances of Comparative Example 2, but exhibited inferior durability as a catalyst when compared to the structured catalysts of Examples 1 to 384.

In addition, the support itself without any catalytic substances of Comparative Example 2 exhibited little catalytic activity in the steam reforming reaction using JIS1 kerosene as the reforming raw material, and was inferior to the structured catalysts of Examples 1 to 384 in both the catalytic activity and the durability.

Next, in addition to the evaluation described above in the case of producing hydrogen using petroleum hydrocarbons, the catalytic activity in the case of steam reforming of the natural gas was evaluated. To the atmospheric pressure flow type reactor, 50 mg of the structured catalyst in which the catalytic substance was Ni nanoparticles (Examples 97 to 192) was filled, and reduction treatment was performed for 1 hour using hydrogen gas at 500° C. before reaction.

Then, methane gas (6 mL/min), pure water (5 μL/min), and $N_2$ as carrier gas at 10 mL/min were each supplied to the reactor, and steam reforming reactions were performed under heating at 100 to 900° C. A single microreactor (Rx-3050SR, available from Frontier Laboratories Ltd.) was used as the atmospheric pressure flow type reactor. The product was analyzed using gas chromatography mass spectrometry (GC/MS). Note that TRACE 1310 GC (available from Thermo Fisher Scientific K.K., detector: thermal conductivity detector) was used as the analysis apparatus for the produced gas.

For the catalytic activity of methane gas in the steam reforming, when the production of carbon monoxide started at 600° C. or lower, it is determined that catalytic activity is excellent, and considered as "A". When the production of carbon monoxide started at higher than 600° C. and lower than 700° C., it is determined that catalytic activity is good, and considered as "B". When the production of carbon monoxide started at 700° C. or higher and lower than 800° C., it is determined that catalytic activity is not good, but is pass level (acceptable), and considered as "C". When the production of carbon monoxide started at 800° C. or higher and lower than 900° C. or when the reaction did not occur, it is determined that catalytic activity is poor (not pass), and considered as "D". The results are shown in Tables 9 and 10.

TABLE 9

| | Manufacturing Conditions of Structured Catalyst | | | | | | | | |
|---|---|---|---|---|---|---|---|---|---|
| | Precursor Material (A) | | Addition to Precursor Material (A) | | Conditions of Hydrothermal Treatment using Precursor Material (C) | | | Structured Catalyst Support Zeolite-Type Compound | |
| No. | Type | Pore Diameter (nm) | Presence or Absence of Additives | Amount of Metal Containing Solution (Ratio of Number of Atoms) Si/M | Type of Structure Directing Agent | pH | Time (h) | Framework | Average Inner Diameter of Channels $D_F$ (nm) |
| Example 97 | MCM-41 | 1.3 | Yes | 1000 | TEABr | 12 | 120 | FAU | 0.74 |
| Example 98 | | | | 500 | | | | | |
| Example 99 | | | | 200 | | | | | |
| Example 100 | | | | 100 | | | | | |
| Example 101 | | 2.0 | | | | | | | |
| Example 102 | | 2.4 | | | | | | | |
| Example 103 | | 2.6 | | | | | | | |
| Example 104 | | 3.3 | | | | | | | |
| Example 105 | | 6.6 | | | | | | | |
| Example 106 | SBA-1 | 13.2 | | | | | | | |
| Example 107 | | 19.8 | | | | | | | |
| Example 108 | | 26.4 | | | | | | | |
| Example 109 | MCM-41 | 1.3 | No | 1000 | | | | | |
| Example 110 | | | | 500 | | | | | |
| Example 111 | | | | 200 | | | | | |
| Example 112 | | | | 100 | | | | | |
| Example 113 | | 2.0 | | | | | | | |
| Example 114 | | 2.4 | | | | | | | |
| Example 115 | | 2.6 | | | | | | | |
| Example 116 | | 3.3 | | | | | | | |
| Example 117 | | 6.6 | | | | | | | |
| Example 118 | SBA-1 | 13.2 | | | | | | | |
| Example 119 | | 19.8 | | | | | | | |
| Example 120 | | 26.4 | | | | | | | |
| Example 121 | MCM-41 | 1.1 | Yes | 1000 | | 11 | 72 | MTW | 0.61 |
| Example 122 | | | | 500 | | | | | |
| Example 123 | | | | 200 | | | | | |
| Example 124 | | | | 100 | | | | | |
| Example 125 | | 1.6 | | | | | | | |
| Example 126 | | 2.0 | | | | | | | |
| Example 127 | | 2.2 | | | | | | | |
| Example 128 | | 2.7 | | | | | | | |
| Example 129 | | 5.4 | | | | | | | |
| Example 130 | SBA-1 | 10.9 | | | | | | | |
| Example 131 | | 16.3 | | | | | | | |
| Example 132 | | 21.8 | | | | | | | |
| Example 133 | MCM-41 | 1.1 | No | 1000 | | | | | |

TABLE 9-continued

| | | | |
|---|---|---|---|
| Example 134 | | | 500 |
| Example 135 | | | 200 |
| Example 136 | | | 100 |
| Example 137 | | 1.6 | |
| Example 138 | | 2.0 | |
| Example 139 | | 2.2 | |
| Example 140 | | 2.7 | |
| Example 141 | | 5.4 | |
| Example 142 | SBA-1 | 10.9 | |
| Example 143 | | 16.3 | |
| Example 144 | | 21.8 | |

| | Structured Catalyst | | | Performance Evaluation | | |
|---|---|---|---|---|---|---|
| | Catalytic Substance | | | | | |
| | Metal Nanoparticles | | | | | Catalytic Activity in |
| No. | Type | Mean Particle Size $D_C$ (nm) | $D_C/D_F$ | Catalytic Activity | Durability | Steam Reforming of Methane Gas |
| Example 97 | Ni | 0.11 | 0.1 | C | C | C |
| Example 98 | | 0.32 | 0.4 | C | C | C |
| Example 99 | | 0.53 | 0.7 | B | C | B |
| Example 100 | | 1.06 | 1.4 | A | B | A |
| Example 101 | | 1.59 | 2.1 | A | B | A |
| Example 102 | | 1.90 | 2.6 | A | A | A |
| Example 103 | | 2.11 | 2.9 | A | A | A |
| Example 104 | | 2.64 | 3.6 | A | A | A |
| Example 105 | | 5.29 | 7.1 | B | A | A |
| Example 106 | | 10.57 | 14.3 | B | A | A |
| Example 107 | | 15.86 | 21.4 | C | A | B |
| Example 108 | | 21.14 | 28.6 | C | A | B |
| Example 109 | | 0.11 | 0.1 | C | C | C |
| Example 110 | | 0.32 | 0.4 | C | C | C |
| Example 111 | | 0.53 | 0.7 | B | C | B |
| Example 112 | | 1.06 | 1.4 | A | B | A |
| Example 113 | | 1.59 | 2.1 | A | B | A |
| Example 114 | | 1.90 | 2.6 | B | A | A |
| Example 115 | | 2.11 | 2.9 | B | A | A |
| Example 116 | | 2.64 | 3.6 | B | A | A |
| Example 117 | | 5.29 | 7.1 | C | A | A |
| Example 118 | | 10.57 | 14.3 | C | A | A |
| Example 119 | | 15.86 | 21.4 | C | A | B |
| Example 120 | | 21.14 | 28.6 | C | A | B |
| Example 121 | | 0.09 | 0.1 | C | C | C |
| Example 122 | | 0.26 | 0.4 | C | C | C |
| Example 123 | | 0.44 | 0.7 | B | C | B |
| Example 124 | | 0.87 | 1.4 | A | B | A |
| Example 125 | | 1.31 | 2.1 | A | B | A |
| Example 126 | | 1.57 | 2.6 | A | B | A |
| Example 127 | | 1.74 | 2.9 | A | A | A |
| Example 128 | | 2.18 | 3.6 | A | A | A |
| Example 129 | | 4.36 | 7.1 | B | A | A |
| Example 130 | | 8.71 | 14.3 | B | A | A |
| Example 131 | | 13.07 | 21.4 | C | A | B |
| Example 132 | | 17.43 | 28.6 | C | A | B |
| Example 133 | | 0.09 | 0.1 | C | C | C |
| Example 134 | | 0.26 | 0.4 | C | C | C |
| Example 135 | | 0.44 | 0.7 | B | C | B |
| Example 136 | | 0.87 | 1.4 | A | B | A |
| Example 137 | | 1.31 | 2.1 | A | B | A |
| Example 138 | | 1.57 | 2.6 | A | B | A |
| Example 139 | | 1.74 | 2.9 | B | A | A |
| Example 140 | | 2.18 | 3.6 | B | A | A |
| Example 141 | | 4.36 | 7.1 | C | A | A |
| Example 142 | | 8.71 | 14.3 | C | A | A |
| Example 143 | | 13.07 | 21.4 | C | A | B |
| Example 144 | | 17.43 | 28.6 | C | A | B |

TABLE 10

| | | | | Addition to Precursor Material (A) | | | Conditions of Hydrothermal Treatment using Precursor Material (C) | | | Structured Catalyst Support Zeolite-Type Compound | |
|---|---|---|---|---|---|---|---|---|---|---|---|
| | | Precursor Material (A) | | Presence or Absence of Additives | Conversion Ratio of Added Amount of Metal Containing Solution (Ratio of Number of Atoms) Si/M | Type of Structure Directing Agent | | | | | Average Inner Diameter of Channels $D_F$ (nm) |
| No. | Type | Pore Diameter (nm) | | | | | pH | Time (h) | | Framework | |
| Example 145 | MCM-41 | 1.0 | | Yes | 1000 | TPABr | 12 | 72 | | MFI | 0.56 |
| Example 146 | | 1.0 | | | 500 | | | | | | |
| Example 147 | | 1.0 | | | 200 | | | | | | |
| Example 148 | | 1.0 | | | 100 | | | | | | |
| Example 149 | | 1.5 | | | | | | | | | |
| Example 150 | | 1.8 | | | | | | | | | |
| Example 151 | | 2.0 | | | | | | | | | |
| Example 152 | | 2.5 | | | | | | | | | |
| Example 153 | | 5.0 | | | | | | | | | |
| Example 154 | SBA-1 | 10.0 | | | | | | | | | |
| Example 155 | | 15.0 | | | | | | | | | |
| Example 156 | | 20.0 | | | | | | | | | |
| Example 157 | MCM-41 | 1.0 | | No | 1000 | | | | | | |
| Example 158 | | 1.0 | | | 500 | | | | | | |
| Example 159 | | 1.0 | | | 200 | | | | | | |
| Example 160 | | 1.0 | | | 100 | | | | | | |
| Example 161 | | 1.5 | | | | | | | | | |
| Example 162 | | 1.8 | | | | | | | | | |
| Example 163 | | 2.0 | | | | | | | | | |
| Example 164 | | 2.5 | | | | | | | | | |
| Example 165 | | 5.0 | | | | | | | | | |
| Example 166 | SBA-1 | 10.0 | | | | | | | | | |
| Example 167 | | 15.0 | | | | | | | | | |
| Example 168 | | 20.0 | | | | | | | | | |
| Example 169 | MCM-41 | 1.0 | | Yes | 1000 | TMABr | 12 | 120 | | FER | 0.57 |
| Example 170 | | 1.0 | | | 500 | | | | | | |
| Example 171 | | 1.0 | | | 200 | | | | | | |
| Example 172 | | 1.0 | | | 100 | | | | | | |
| Example 173 | | 1.5 | | | | | | | | | |
| Example 174 | | 1.8 | | | | | | | | | |
| Example 175 | | 2.0 | | | | | | | | | |
| Example 176 | | 2.5 | | | | | | | | | |
| Example 177 | | 5.1 | | | | | | | | | |
| Example 178 | SBA-1 | 10.2 | | | | | | | | | |
| Example 179 | | 15.3 | | | | | | | | | |
| Example 180 | | 20.4 | | | | | | | | | |
| Example 181 | MCM-41 | 1.0 | | No | 1000 | | | | | | |
| Example 182 | | 1.0 | | | 500 | | | | | | |
| Example 183 | | 1.0 | | | 200 | | | | | | |
| Example 184 | | 1.0 | | | 100 | | | | | | |
| Example 185 | | 1.5 | | | | | | | | | |
| Example 186 | | 1.8 | | | | | | | | | |
| Example 187 | | 2.0 | | | | | | | | | |
| Example 188 | | 2.5 | | | | | | | | | |
| Example 189 | | 5.1 | | | | | | | | | |
| Example 190 | SBA-1 | 10.2 | | | | | | | | | |
| Example 191 | | 15.3 | | | | | | | | | |
| Example 192 | | 20.4 | | | | | | | | | |

TABLE 10-continued

| No. | Structured Catalyst Catalytic Substance Metal Nanoparticles Type | Mean Particle Size $D_C$ (nm) | $D_C/D_F$ | Catalytic Activity | Durability | Catalytic Activity in Steam Reforming of Methane Gas |
|---|---|---|---|---|---|---|
| Example 145 | Ni | 0.08 | 0.1 | C | C | C |
| Example 146 | | 0.24 | 0.4 | C | C | C |
| Example 147 | | 0.40 | 0.7 | B | C | B |
| Example 148 | | 0.80 | 1.4 | A | B | A |
| Example 149 | | 1.20 | 2.1 | A | B | A |
| Example 150 | | 1.44 | 2.6 | A | A | A |
| Example 151 | | 1.60 | 2.9 | A | A | A |
| Example 152 | | 2.00 | 3.6 | A | A | A |
| Example 153 | | 4.00 | 7.1 | B | A | A |
| Example 154 | | 8.00 | 14.3 | B | A | A |
| Example 155 | | 12.00 | 21.4 | C | A | B |
| Example 156 | | 16.00 | 28.6 | C | A | B |
| Example 157 | | 0.08 | 0.1 | C | C | C |
| Example 158 | | 0.24 | 0.4 | C | C | C |
| Example 159 | | 0.40 | 0.7 | B | C | B |
| Example 160 | | 0.80 | 1.4 | A | B | A |
| Example 161 | | 1.20 | 2.1 | A | B | A |
| Example 162 | | 1.44 | 2.6 | B | A | A |
| Example 163 | | 1.60 | 2.9 | B | A | A |
| Example 164 | | 2.00 | 3.6 | B | A | A |
| Example 165 | | 4.00 | 7.1 | C | A | A |
| Example 166 | | 8.00 | 14.3 | C | A | A |
| Example 167 | | 12.00 | 21.4 | C | A | B |
| Example 168 | | 16.00 | 28.6 | C | A | B |
| Example 169 | | 0.08 | 0.1 | C | C | C |
| Example 170 | | 0.24 | 0.4 | C | C | C |
| Example 171 | | 0.41 | 0.7 | B | C | B |
| Example 172 | | 0.81 | 1.4 | A | B | A |
| Example 173 | | 1.22 | 2.1 | A | B | A |
| Example 174 | | 1.47 | 2.6 | A | B | A |
| Example 175 | | 1.63 | 2.9 | A | A | A |
| Example 176 | | 2.04 | 3.6 | A | A | A |
| Example 177 | | 4.07 | 7.1 | B | A | A |
| Example 178 | | 8.14 | 14.3 | B | A | A |
| Example 179 | | 12.21 | 21.4 | C | A | B |
| Example 180 | | 16.29 | 28.6 | C | A | B |
| Example 181 | | 0.08 | 0.1 | C | C | C |
| Example 182 | | 0.24 | 0.4 | C | C | C |
| Example 183 | | 0.41 | 0.7 | B | C | B |
| Example 184 | | 0.81 | 1.4 | A | B | A |
| Example 185 | | 1.22 | 2.1 | A | B | A |
| Example 186 | | 1.47 | 2.6 | A | B | A |
| Example 187 | | 1.63 | 2.9 | B | A | A |
| Example 188 | | 2.04 | 3.6 | B | A | A |
| Example 189 | | 4.07 | 7.1 | C | A | A |
| Example 190 | | 8.14 | 14.3 | C | A | A |
| Example 191 | | 12.21 | 21.4 | C | A | B |
| Example 192 | | 16.29 | 28.6 | C | A | B |

As can be seen from Tables 9 and 10, it was found that catalytic activity of methane gas in the steam reforming was high when the catalytic substance was Ni nanoparticles. Also, it is disclosed that in steam reforming, metals of Groups VIII, IX and X except Os (Rh, Ru, Ni, Pt, Pd, Ir, Co, Fe) are highly active, and the main activity ranking is Rh, Ru>Ir>Ni, Pt, Pd. Thus, at least Rh, Ru, Ir, Pt, and Pd, which exhibit activity equal to or greater than that of Ni, especially Rh, Ru, and Ir are also expected to have excellent catalytic activity in steam reforming.

As described above, by using the structured catalyst according to the examples in the steam reforming reaction using a reforming raw material such as natural gas containing hydrocarbons such as methane or the like, or in the partial oxidation reaction and the steam reforming reaction using a reforming raw material containing hydrocarbons such as methanol or the like, reformed gas containing hydrogen can be efficiently produced. That is, the structured catalyst according to the examples can exhibit favorable catalytic activity and durability, as described above, in the steam reforming reaction (and in combination with partial oxidation reaction) using a reforming raw material containing various hydrocarbons.

Other Embodiments (1) A method of using a structured catalyst to produce, from hydrocarbon and steam, reformed gas containing hydrogen, wherein the structured catalyst includes a support having a porous structure constituted of a zeolite-type compound; and at least one catalytic substance present inside the support, the support includes channels connecting with each other, and the catalytic substance is metal nanoparticles and present at least in the channels of the support.

(2) The method of using the structured catalyst according to (1), including the step of supplying a reforming raw material containing hydrocarbon and steam to the structured catalyst.

(3) The method of using the structured catalyst according to (1) or (2), wherein the structured catalyst is used in a reforming apparatus to perform a reforming treatment of a reforming raw material containing hydrocarbon with the reforming apparatus.

What is claimed is:

1. A structured catalyst for steam reforming used for producing, from a reforming raw material containing hydrocarbon, reformed gas containing hydrogen, the structured catalyst comprising:
    a support having a porous structure constituted of a zeolite-type compound; and
    at least one catalytic substance present inside the support, wherein
    the support includes channels connecting with each other, and
    the catalytic substance is metal nanoparticles and present at least in the channels of the support, wherein
    the channels include any one of a one-dimensional pore, a two-dimensional pore, and a three-dimensional pore defined by a framework of the zeolite-type compound and a plurality of enlarged pore portions having a diameter different from that of any of the one-dimensional pore, the two-dimensional pore, and the three-dimensional pore,
    the metal nanoparticles are embedded in a respective enlarged pore portion such that a metal nanoparticle is separate from another metal nanoparticle of the metal nanoparticles, and
    the average inner diameter of the channels is less than the inner diameter of the enlarged pore portion.

2. The structured catalyst for steam reforming according to claim 1, wherein
    the metal nanoparticles are nanoparticles composed of at least one type of metal selected from the group consisting of rhodium (Rh), ruthenium (Ru), iridium (Ir), palladium (Pd), platinum (Pt), iron (Fe), cobalt (Co), and nickel (Ni).

3. The structured catalyst for steam reforming according to claim 2, wherein
    the average inner diameter of the channels is from 0.1 nm to 1.5 nm, and
    the inner diameter of the enlarged pore portion is from 0.5 nm to 50 nm.

4. The structured catalyst for steam reforming according to claim 1, wherein
    the enlarged pore portion causes a plurality of pores constituting any one of the one-dimensional pore, the two-dimensional pore, and the three-dimensional pore to connect with each other.

5. The structured catalyst for steam reforming according to claim 1, wherein
    a mean particle size of the metal nanoparticles is greater than an average inner diameter of the channels and is less than or equal to an inner diameter of the enlarged pore portion.

6. The structured catalyst for steam reforming according to claim 1, wherein
    a metal element (M) of the metal nanoparticles is contained in an amount from 0.5 to 2.5 mass % based on the structured catalyst for steam reforming.

7. The structured catalyst for steam reforming according to claim 1, wherein
    the mean particle size of the metal nanoparticles is from 0.08 nm to 30 nm.

8. The structured catalyst for steam reforming according to claim 7, wherein
    the mean particle size of the metal nanoparticles is from 0.4 nm to 11.0 nm.

9. The structured catalyst for steam reforming according to claim 1, wherein
    a ratio of the mean particle size of the metal nanoparticles to the average inner diameter of the channels is from 0.05 to 300.

10. The structured catalyst for steam reforming according to claim 9, wherein
    the ratio of the mean particle size of the metal nanoparticles to the average inner diameter of the channels is from 0,1 to 30.

11. The structured catalyst for steam reforming according to claim 10, wherein
    the ratio of the mean particle size of the metal nanoparticles to the average inner diameter of the channels is from 1.4 to 3.6.

12. The structured catalyst for steam reforming according to claim 1, further comprising at least one other catalytic substance held on an outer surface of the support.

13. The structured catalyst for steam reforming according to claim 12, wherein
    a content of the at least one catalytic substance present inside the support is greater than a content of the at least one other catalytic substance held on the outer surface of the support.

14. The structured catalyst for steam reforming according to claim 1, wherein
    the zeolite-type compound is a silicate compound.

15. A reforming apparatus comprising the structured catalyst for steam reforming according to claim 1.

16. A method for manufacturing a reduced structured catalyst for steam reforming, the method comprising the steps of:
    calcinating a precursor material (B) obtained by impregnating, with metal containing solution, a precursor material (A) for obtaining a support having a porous structure constituted of a zeolite-type compound;
    hydrothermally treating a precursor material (C) obtained by calcinating the precursor material (B) to obtain an oxidized structured catalyst; and
    performing a reduction treatment of the oxidized structured catalyst that has been hydrothermally treated to obtain the reduced structured catalyst.

17. The method for manufacturing a structured catalyst for steam reforming according to claim 16, wherein
    from 50 to 500 mass % of a non-ionic surfactant is added to the precursor material (A) before the calcinating.

18. The method for manufacturing a structured catalyst for steam reforming according to claim 16, wherein
    the precursor material (A) is impregnated with the metal containing solution by adding the metal containing solution to the precursor material (A) in multiple portions before the calcinating.

19. The method for manufacturing a structured catalyst for steam reforming according to claim 16, wherein in impregnating the precursor material (A) with the metal containing solution before the calcinating, an added amount of the metal containing solution added to the precursor material (A), in terms of a ratio of silicon (Si) constituting the precursor material (A) to a metal element (M) contained in the metal containing solution added to the precursor material (A) (a ratio of number of atoms Si/M), is adjusted to from 10 to 1000.

\* \* \* \* \*